(12) United States Patent
Ikeura et al.

(10) Patent No.: US 12,466,978 B2
(45) Date of Patent: Nov. 11, 2025

(54) NANOCELLULOSE-CONTAINING AQUEOUS COATING COMPOSITION FOR AUTOMOTIVE EXTERIOR

(71) Applicant: KANSAI PAINT CO., LTD., Hyogo (JP)

(72) Inventors: Yukihiro Ikeura, Aichi (JP); Gen Yokota, Aichi (JP); Eisuke Nishiguchi, Aichi (JP); Hiroaki Yamada, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 17 days.

(21) Appl. No.: 18/289,285

(22) PCT Filed: Mar. 31, 2022

(86) PCT No.: PCT/JP2022/016615
§ 371 (c)(1),
(2) Date: Nov. 2, 2023

(87) PCT Pub. No.: WO2022/259744
PCT Pub. Date: Dec. 15, 2022

(65) Prior Publication Data
US 2024/0240049 A1    Jul. 18, 2024

(30) Foreign Application Priority Data

Jun. 9, 2021    (JP) .................................. 2021-096364

(51) Int. Cl.
| | |
|---|---|
| *C09D 175/04* | (2006.01) |
| *B05D 7/00* | (2006.01) |
| *B05D 7/14* | (2006.01) |
| *B05D 7/24* | (2006.01) |
| *C09D 7/20* | (2018.01) |
| *C09D 7/65* | (2018.01) |
| *C09D 17/00* | (2006.01) |
| *C09D 133/08* | (2006.01) |

(52) U.S. Cl.
CPC ............. *C09D 175/04* (2013.01); *B05D 7/14* (2013.01); *B05D 7/24* (2013.01); *B05D 7/572* (2013.01); *C09D 7/20* (2018.01); *C09D 7/65* (2018.01); *C09D 17/003* (2013.01); *C09D 133/08* (2013.01); *B05D 2202/00* (2013.01); *B05D 2401/21* (2013.01); *B05D 2503/00* (2013.01)

(58) Field of Classification Search
CPC .......... C09D 175/04; C09D 7/20; C09D 7/65; C09D 17/003; C09D 133/08; C09D 5/024; C09D 7/41; C09D 7/61; C09D 7/68; C09D 101/02; B05D 7/14; B05D 7/24; B05D 7/572; B05D 2202/00; B05D 2401/21; B05D 2503/00; B05D 2202/10; C08K 3/013; C08K 5/0041
USPC ................ 427/372.2, 384–388.1, 407.1, 409
See application file for complete search history.

(56) References Cited

U.S. PATENT DOCUMENTS

| | | | |
|---|---|---|---|
| 2019/0077985 A1 | 3/2019 | Kanda | |
| 2019/0308217 A1* | 10/2019 | Okazaki | ................... C09D 7/70 |
| 2020/0238333 A1* | 7/2020 | Itoh | ..................... C09D 17/001 |
| 2020/0338591 A1 | 10/2020 | Sakai et al. | |
| 2020/0398308 A1 | 12/2020 | Okazaki et al. | |

FOREIGN PATENT DOCUMENTS

| | | | |
|---|---|---|---|
| CN | 111655386 | 9/2020 | |
| JP | 2018-76495 | 5/2018 | |
| JP | 2019-1918 | 1/2019 | |
| JP | 2019-194323 | 11/2019 | |
| JP | 7225476 B1 * | 2/2023 | ............... B05D 7/14 |
| WO | 2017/164072 | 9/2017 | |
| WO | 2017/175468 | 10/2017 | |
| WO | WO-2017175468 A1 * | 10/2017 | ............... B05D 1/36 |
| WO | WO-2018012014 A1 * | 1/2018 | ............... B05D 1/36 |
| WO | 2019/139138 | 7/2019 | |
| WO | 2019/142639 | 7/2019 | |

OTHER PUBLICATIONS

Dispersion, Hawley's Condensed Chemical Dictionary 433 (11th ed. 1987). (Year: 1987).*
English translation for Written Opinion in PCT/JP2022/018535. (Year: 2022).*
International Search Report issued Jun. 21, 2022 in International (PCT) Application No. PCT/JP2022/016615.
Extended European Search Report issued Aug. 11, 2025 in European Patent Application No. 22819932.9.

* cited by examiner

*Primary Examiner* — William P Fletcher, III
(74) *Attorney, Agent, or Firm* — Wenderoth, Lind & Ponack, L.L.P.

(57) ABSTRACT

An aqueous coating composition for an automotive exterior, containing resin particles (A), a crosslinking agent (B), a pigment (C), and a nanocellulose (D), wherein a content of the nanocellulose (D) is 0.5 to 2.0 parts by mass in terms of solid content with respect to 100 parts by mass of a resin solid content in the coating, a solid content concentration of the coating composition is in a range from 45 to 65 mass %, and a viscosity is in a range from 350 to 1200 mPa·s. Also, an automobile coated with the aqueous coating composition, a method of forming a coating film using the aqueous coating composition, and a method of forming a multilayer coating film comprising applying the aqueous coating composition on an object, applying an aqueous second colored coating composition thereon, then applying a clearcoat coating composition thereon, and simultaneously heat-curing the compositions.

8 Claims, No Drawings

NANOCELLULOSE-CONTAINING AQUEOUS COATING COMPOSITION FOR AUTOMOTIVE EXTERIOR

TECHNICAL FIELD

The present invention relates to an aqueous coating composition for automotive exterior.

BACKGROUND ART

In recent years, from the viewpoint of global environmental protection, it has been required to reduce volatile organic compounds (VOC) emitted from coatings, and organic solvent-based coatings have been increasingly replaced with aqueous coatings in the fields of coating of industrial products such as industrial machines, construction machines, steel furniture and warehouses, automotive outer panels, and automotive parts.

Also in the coating of automobiles, a large amount of organic solvent-based coatings were used in the past, and there was an urgent need to reduce VOC emitted from the coatings.

However, for various coatings used in undercoating, intermediate coating, and topcoating processes of automobiles, replacement of organic solvent-based coatings with aqueous coatings has been advanced, and coating with aqueous coatings is now mainstream. In a case where the aqueous coatings contain an organic solvent as a part of a medium, it is required to reduce the content of the organic solvent.

Meanwhile, shortening of coating processes by omitting a part of a heat curing process which was performed for each coating film layer of the intermediate coating and the topcoating (mainly omitting the heat curing process and a preheating process after the intermediate coating) has been developed to reduce the environmental load, and automotive coating with a reduced number of processes is becoming mainstream.

In addition, aqueous coatings have a high latent heat of vaporization of water, which is the medium, and a high polarity, and thus have a narrow coating operation range (allowable range of temperature-humidity conditions in which coating operability is established) to require more energy cost for providing an appropriate coating environment (air conditioning and the like of a coating booth environment) than organic solvent-based coatings, whereby reduction of cost for air conditioning of the coating environment is also required.

From the viewpoint of facilities and the like required for air conditioning, heating in winter requires more energy cost than cooling in summer. Water as a medium is less likely to evaporate in a low-temperature environment in winter, which is a severe condition for sagging from the viewpoint of coating operability. For improvement of sagging, heightening of a coating solid content of the aqueous coatings is expected as an improvement method, and for reducing an environmental load relating to air conditioning of the coating environment of the aqueous coatings, the aqueous coatings having high solid content concentration (high solid content) is being developed.

For example, Patent Document 1 discloses an aqueous coating composition containing: resin particles (A) having an average particle size of 300 to 1000 nm; a polyoxyalkylene group-containing polyol (B) having a number average molecular weight of 300 to 2000 and/or a diester compound (C) having a specific structure; and a crosslinking agent (D), wherein the total solid content of the polyoxyalkylene group-containing polyol (B) and the diester compound (C) is 5 to 25 mass % relative to the total solid content of the resin particles (A), the polyoxyalkylene group-containing polyol (B), the diester compound (C), and the crosslinking agent (D), and discloses that the aqueous coating composition has a wide coating operation range, excellent coating film performance such as finished appearance and chipping resistance, and a high solid content.

CITATION LIST

Patent Literature

Patent Document 1: WO 2017/164072

SUMMARY OF INVENTION

Technical Problem

However, the aqueous coating composition described in Patent Document 1 may have insufficient popping resistance. Here, a popping is a foam-shaped coating film defect on a coating film surface. A medium remaining inside the coating film is rapidly evaporated during heat-curing to form a bubble in the coating film, and at the same time, a resin component in the coating film is solidified, whereby a portion where the bubble is formed appears as a foam-shaped defect. The popping is sometimes referred to as a pinhole.

Accordingly, the present invention is directed to providing an aqueous coating composition for automotive exterior which has a high solid content concentration and is excellent in sagging resistance and popping resistance.

Solution to Problem

As a result of intensive studies to achieve the above object, the present inventors have found an aqueous coating composition for automotive exterior that can achieve the above object.

The aqueous coating composition contains resin particles (A), a crosslinking agent (B), a pigment (C), and a nanocellulose (D). In the aqueous coating composition, a content of the nanocellulose (D) is in a range from 0.5 to 2.0 parts by mass in terms of solid content with respect to 100 parts by mass of a resin solid content in the coating, a solid content concentration of the coating composition is in a range from 45 to 65 mass %, and a viscosity of the coating composition measured by a Brookfield-type viscometer under measurement conditions of a temperature of 20° C. and a rotor rotation speed of 60 rpm is in a range from 350 to 1200 mPa s.

That is, the present invention relates to the following <1> to <8>.

<1> An aqueous coating composition for automotive exterior, the aqueous coating composition containing:
  resin particles (A);
  a crosslinking agent (B);
  a pigment (C); and
  a nanocellulose (D),
  wherein
  a content of the nanocellulose (D) is 0.5 to 2.0 parts by mass in terms of solid content with respect to 100 parts by mass of a resin solid content in the coating,
  a solid content concentration of the coating composition is in a range from 45 to 65 mass %, and a viscosity of the coating composition measured by a Brookfield-type viscometer under measurement conditions of a temperature of 20° C. and a rotor rotation speed of 60 rpm is in a range from 350 to 1200 mPa s.

<2> The aqueous coating composition for automotive exterior according to <1>, wherein the resin particles (A) have an average particle size in a range from 300 to 800 nm.

<3> The aqueous coating composition for automotive exterior according to <1> or <2>, wherein the nanocellulose (D) is at least one type selected from the group consisting of cellulose nanofibers (D1) and cellulose nanocrystals (D2).

<4> The aqueous coating composition for automotive exterior according to any one of <1> to <3>, wherein the aqueous coating composition contains no organic solvent (E) having a solubility in water at 20° C. of 4 mass % or less, or a content of the organic solvent (E) having a solubility in water at 20° C. of 4 mass % or less is 19 parts by mass or less with respect to 100 parts by mass of the resin solid content in the coating.

<5> The aqueous coating composition for automotive exterior according to <4>, wherein the content of the organic solvent (E) having a solubility in water at 20° C. of 4 mass % or less is in a range from 1 to 19 parts by mass with respect to 100 parts by mass of the resin solid content in the coating.

<6> An automobile coated with the aqueous coating composition for automotive exterior described in any one of <1> to <5>.

<7> A method for forming a coating film, including applying the aqueous coating composition for automotive exterior described in any one of <1> to <5> to an object to be coated.

<8> A method for forming a multilayer coating film, the method including:
(1) applying the aqueous coating composition for automotive exterior described in any one of <1> to <5> onto an object to be coated to form a first colored coating film;
(2) applying, on the first colored coating film that is uncured, an aqueous second colored coating composition to form a second colored coating film;
(3) applying, on the second colored coating film that is uncured, a clearcoat coating composition to form a clearcoat coating film; and
(4) simultaneously heat-curing the first colored coating film that is uncured, the second colored coating film that is uncured, and the clearcoat coating film that is uncured.

Advantageous Effects of Invention

According to the present invention, it is possible to provide an aqueous coating composition for automotive exterior which has a high solid content concentration and is excellent in sagging resistance and popping resistance.

DESCRIPTION OF EMBODIMENTS

The aqueous coating composition for automotive exterior according to the present invention contains resin particles (A), a crosslinking agent (B), a pigment (C), and a nanocellulose (D). In the aqueous coating composition, a content of the nanocellulose (D) is 0.5 to 2.0 parts by mass in terms of solid content with respect to 100 parts by mass of a resin solid content in the coating, a solid content concentration of the coating composition is 45 to 65 mass %, and a viscosity of the coating composition measured by a Brookfield-type viscometer under measurement conditions of a temperature of 20° C. and a rotor rotation speed of 60 rpm is in a range from 350 to 1200 mPa s.

Note that in the present specification, the "solid content" refers to nonvolatile components such as a resin, a curing agent, and a pigment remaining after drying at 110° C. for 1 hour. The solid content can be determined, for example, by weighing a sample in a heat-resistant container such as an aluminum foil cup, spreading the sample on the bottom surface of the container, then drying the sample at 110° C. for 1 hour, and weighing the mass of the components remaining after drying.

In addition, in the present specification, the "solid content concentration" refers to a content mass ratio of the solid content in a composition. Thus, the solid content concentration of the composition can be calculated, for example, by weighing the composition into a heat-resistant container such as an aluminum foil cup, spreading the composition on the bottom surface of the container, then drying the composition at 110° C. for 1 hour, weighing the mass of the components in the composition remaining after drying, and determining a ratio of the mass of the components remaining after drying to the total mass of the composition before drying.

Resin Particles (A) A type of a resin of the resin particles (A) is not particularly limited as long as the resin particles (A) are resin particles. In the present specification, the resin particles mean a resin that is dispersed in water or an aqueous medium, which is a mixed medium of water and an organic solvent, in a state of particles and can be present in water or the aqueous medium in a state of having a particle size when measured by a submicron particle size distribution measurement device by a laser diffraction/scattering method. As the submicron particle size distribution measurement device based on the laser diffraction/scattering method, for example, "Microtrac MT3000" (trade name, available from Microtrac Retsch GmbH) can be used.

From the viewpoint of the popping resistance of the resulting aqueous coating composition for automotive exterior, smoothness of a coating film to be formed, and the like, the resin particles (A) preferably have an average particle size in a range from 50 to 1000 nm, and more preferably in a range from 70 to 800 nm. Above all, from the viewpoint of heightening of a solid content, popping resistance, and the like of the resulting aqueous coating composition for automotive exterior, the average particle size is preferably in a range from 300 to 800 nm, more preferably in a range from 320 to 750 nm, and further particularly preferably in a range from 330 to 730 nm.

In the present specification, the average particle size of the resin particles is a value measured at 20° C. using the submicron particle size distribution measurement device based on the laser diffraction/scattering method after dilution with deionized water by a common method.

Examples of types of the resin particles include urethane resin particles (A1), acrylic resin particles (A2), acrylic-urethane composite resin particles (A3), polyester resin particles (A4), acrylic-polyester composite resin particles (A5), and epoxy resin particles. These resins can each be used alone, or two or more types of these resins can be combined and used.

Among them, from the viewpoint of improvement of the sagging resistance of the resulting aqueous coating composition for automotive exterior, finished appearance of a coating film to be formed, and the like, the resin particles (A) preferably contain at least one type selected from the group consisting of the urethane resin particles (A1), the acrylic resin particles (A2), the acrylic-urethane composite resin particles (A3), the polyester resin particles (A4), and the acrylic-polyester composite resin particles (A5), and more preferably contains at least one type selected from the group consisting of the urethane resin particles (A1), the acrylic resin particles (A2), and the acrylic-urethane composite resin particles (A3). Among them, the resin particles (A) still more preferably contain at least one type selected from the group consisting of the urethane resin particles (A1) and the acrylic resin particles (A2), and particularly preferably contains the urethane resin particles (A1) and the acrylic resin particles (A2).

In addition, from the viewpoint of curability of the resulting aqueous coating composition for automotive exterior, the resin particles (A) preferably have a crosslinkable functional group such as a hydroxyl group, a carboxyl group, or an epoxy group. Among them, the resin particles (A) preferably have a hydroxyl group and/or a carboxyl group, and more preferably have a hydroxyl group.

In a case where the resin particles (A) has a hydroxyl group, the resin particles (A) has a hydroxyl value preferably in a range from 1 to 150 mg KOH/g, more preferably in a range from 2 to 100 mg KOH/g, and further particularly preferably in a range from 5 to 90 mg KOH/g, from the viewpoint of curability and the like of the resulting aqueous coating composition for automotive exterior.

In a case where the resin particles (A) has an acid group such as a carboxyl group, from the viewpoint of stability of the resin particles (A), water resistance of a coating film to be formed, and the like, the resin particles (A) preferably has an acid value in a range from 1 to 100 mg KOH/g, more preferably in a range from 2 to 50 mg KOH/g, and further particularly preferably in a range from 3 to 30 mg KOH/g.

The resin particles (A) may have a core/shell structure. Herein, a "shell portion" means a polymer layer present in an outermost layer of the resin particle, a "core portion" means a polymer layer of an inner layer of the resin particle excluding the shell portion, and the "core/shell structure" means a structure having the core portion and the shell portion. The core-shell structure described above is typically a layer structure in which the core portion is completely covered by the shell portion. However, depending on a mass ratio and the like of the core portion and the shell portion, an amount of the monomer of the shell portion may be insufficient to form a layer structure. In such a case, it is not necessary to have a complete layer structure as described above, and the structure may be a structure in which a portion of the core portion is covered by the shell portion, or a structure in which a polymerizable unsaturated monomer that is a constituent element of the shell portion is graft-polymerized with a portion of the core portion. Furthermore, the concept of a multi-layer structure in the core/shell structure is also similarly applicable in a case where a multi-layer structure is formed in the core portion in the resin particles (A). The core/shell structure can be formed, for example, by reacting monomer compositions having different compositions in multiple stages.

In a case where the resin particles (A) have an acid group, it is preferable to neutralize the resin particles (A) with a neutralizing agent to facilitate mixing and dispersion of the resin particles (A) in water from the viewpoint of improving water dispersibility.

Examples of the neutralizing agent include: hydroxides of alkali metals or alkaline earth metals such as sodium hydroxide, potassium hydroxide, lithium hydroxide, calcium hydroxide, and barium hydroxide; ammonia; primary monoamine compounds such as ethylamine, propylamine, butylamine, cyclohexylamine, monoethanolamine, isopropanolamine, neopentanolamine, 2-aminopropanol, 3-aminopropanol, and 2-amino-2-methylpropanol; secondary monoamine compounds such as diethylamine, dibutylamine, diethanolamine, dipropylamine, diisopropanolamine, N-methylethanolamine, N-ethylethanolamine, and N-methylisopropanolamine; tertiary monoamine compounds such as triethylamine, tributylamine, dimethylethanolamine, diethylethanolamine, methyldiethanolamine, dimethylaminoethanol, and triethanolamine; polyamine compounds such as ethylenediamine, diethylenetriamine, hydroxyethylaminoethylamine, ethylaminoethylamine, and methylaminopropylamine; pyridine; and morpholine.

Among them, it is preferable to use a primary monoamine compound, a secondary monoamine compound, a tertiary monoamine compound, and a polyamine compound.

From the viewpoint of viscosity of the resulting aqueous coating composition for automotive exterior, a viscosity when the resin particles (A) are in a form of an aqueous dispersion is preferably in a range from 1 to 10000 mPa s, more preferably in the range from 200 to 8000 mPa s, and particularly preferably in a range from 300 to 7000 mPa s, as measured by a Brookfield-type viscometer under measurement conditions of a temperature of 20° C. and a rotor rotation speed of 60 rpm.

Urethane Resin Particles (A1)

The urethane resin particles (A1) can generally be produced from components including a polyisocyanate component and a polyol component.

Examples of the polyisocyanate component include alicyclic diisocyanates, aromatic diisocyanates, aliphatic diisocyanates, and polyisocyanates having three or more isocyanate groups in one molecule.

Examples of the alicyclic diisocyanates include isophorone diisocyanate, dicyclohexylmethane-4,4'-diisocyanate, trans-1,4-cyclohexyl diisocyanate, and norbornene diisocyanate.

Examples of the aromatic diisocyanates include tolylene diisocyanate, diphenylmethane-4,4'-diisocyanate, p-phenylene diisocyanate, xylylene diisocyanate, 1,5-naphthylene diisocyanate, 3,3'-dimethyldiphenyl-4,4'-diisocyanate, dianisidine diisocyanate, and tetramethylxylylene diisocyanate.

Examples of the aliphatic diisocyanates include 1,6-hexamethylene diisocyanate, 2,2,4 and/or (2,4,4)-trimethylhexamethylene diisocyanate, and lysine diisocyanate.

Examples of the polyisocyanates having three or more isocyanate groups in one molecule include: isocyanurate trimers, biuret trimers, and trimethylolpropane adducts of the above-exemplified diisocyanates; and tri- or higher-functional polyisocyanates such as triphenylmethane triisocyanate, 1-methylbenzol-2,4,6-triisocyanate, and dimethyltriphenylmethane tetraisocyanate. These isocyanate compounds may be used in a form of modified products such as carbodiimide-modified, isocyanurate-modified, and biuret-modified isocyanate compounds.

The polyisocyanate described above may be used in a form of a blocked isocyanate which is blocked with a blocking agent.

Examples of the polyol component having a low molecular weight include dihydric alcohols such as ethylene glycol, diethylene glycol, propylene glycol, butylene glycol, and hexamethylene glycol; trihydric alcohols such as trimethylolpropane and glycerin; and tetrahydric alcohols such as pentaerythritol. Examples of the polyol component having a high molecular weight include polycarbonate polyol, polyols having an ester bond, polycaprolactone polyol, polyether polyol, polyether polyol, polybutadiene polyol, and silicone polyol.

The polycarbonate polyol is a compound produced by polycondensation reaction of a known polyol and a carbonylating agent in a common method. Examples of the polyol include a diol and a polyhydric alcohol such as trihydric or higher alcohols.

Examples of the diol include: linear diols such as 1,3-propanediol, 1,4-butanediol, 1,5-pentanediol, 1,6-hexanediol, 1,7-heptanediol, 1,8-octanediol, 1,9-nonanediol, and 1,10-decanediol; branched diols such as 2-methyl-1,3-propanediol, 3-methyl-1,5-pentanediol, neopentyl glycol, 2-ethyl-1,6-hexanediol, 2,2-diethyl-1,3-propanediol, 2-butyl-2-ethyl-1,3-propanediol, 2-methyl-1,8-octanediol, 2,2,4-trimethyl-1,3-pentanediol, and 2-ethyl-1,3-hexanediol; alicyclic diols such as 1,3-cyclohexanediol, 1,4-cyclohexanediol, and 1,4-cyclohexanedimethanol; aromatic diols such as p-xylenediol and p-tetrachloroxylenediol; and ether-based diols such as diethylene glycol and dipropylene glycol. These diols can be used alone or in combination of two or more.

Examples of the trihydric or higher alcohols include glycerin, trimethylolethane, trimethylolpropane, a dimer of trimethylolpropane, and pentaerythritol. These trihydric or higher alcohols can be used alone or in combination of two or more.

As the carbonylating agent, a known agent can be used. Specific examples thereof include alkylene carbonate, dialkyl carbonate, diallyl carbonate, and phosgene, and these can be used alone or in combination of two or more. Among them, preferred examples include ethylene carbonate, propylene carbonate, dimethyl carbonate, diethyl carbonate, dibutyl carbonate, and diphenyl carbonate.

Examples of the polyols having an ester bond include polyester polyol and polyester polycarbonate polyol.

Examples of the polyester polyol include those produced by a direct esterification reaction and/or a transesterification reaction between a polyhydric alcohol and a polyvalent carboxylic acid or an ester-forming derivative thereof such as an ester, an anhydride or a halide thereof.

Examples of the polyhydric alcohol include aliphatic diols such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, 1,10-decanediol, diethylene glycol, and triethylene glycol; alicyclic diols such as cyclohexanedimethanol and cyclohexanediol; and trihydric or higher alcohols such as trimethylolethane, trimethylolpropane, hexitols, pentitols, glycerin, pentaerythritol, and tetramethylolpropane.

Examples of the polyvalent carboxylic acids or ester-forming derivatives thereof include aliphatic dicarboxylic acids such as oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, a hydrogenated dimer acid, and a dimer acid; aromatic dicarboxylic acids such as phthalic acid, terephthalic acid, isophthalic acid, and naphthalenedicarboxylic acid; alicyclic dicarboxylic acids such as 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 1,4-dicarboxylmethylenecyclohexane, nadic acid, and methylnadic acid; polyvalent carboxylic acids such as tricarboxylic acids such as trimellitic acid, trimesic acid, and castor oil fatty acid, acid anhydrides of these polyvalent carboxylic acids, halides such as chlorides and bromides of these polyvalent carboxylic acids, lower esters such as methyl ester, ethyl ester, propyl ester, isopropyl ester, butyl ester, isobutyl ester, and amyl ester of these polyvalent carboxylic acids; and lactones such as γ-caprolactone, δ-caprolactone, ε-caprolactone, dimethyl-ε-caprolactone, δ-valerolactone, γ-valerolactone, and γ-butyrolactone.

Examples of the polycaprolactone polyol include ring-opened polymers of caprolactone such as polycaprolactone diol.

Examples of the polyether polyol include ethylene oxide and/or propylene oxide adducts of the low-molecular-weight polyols described above, and polytetramethylene glycol.

Examples of the silicone polyol include silicone oils having a siloxane bond in the molecule and a hydroxyl group at the terminal.

As the polyol component, a carboxyl group-containing diol can be used. The carboxyl group-containing diol is used for introducing a hydrophilic group into a polyurethane molecule.

The hydrophilic group is a carboxyl group. Specific examples thereof include dimethylolpropionic acid, dimethylolbutanoic acid, dimethylolbutyric acid, and dimethylolvaleric acid.

In addition to the polyisocyanate component and the polyol component, an amine component can be used as necessary. Examples of the amine component include monoamine compounds and diamine compounds.

The monoamine compound is not particularly limited, and well-known general monoamine compounds can be used alone or in combination of two or more. Examples of the monoamine compounds include alkylamines such as ethylamine, propylamine, 2-propylamine, butylamine, 2-butylamine, tert-butylamine, and isobutylamine; aromatic amines such as aniline, methylaniline, phenylnaphthylamine, and naphthylamine; alicyclic amines such as cyclohexylamine and methylcyclohexylamine; ether amines such as 2-methoxyethylamine, 3-methoxypropylamine, and 2-(2-methoxyethoxy)ethylamine; and alkanolamines such as ethanolamine, propanolamine, butylethanolamine, 1-amino-2-methyl-2-propanol, 2-amino-2-methylpropanol, diethanolamine, diisopropanolamine, dimethylaminopropylethanolamine, dipropanolamine, N-methylethanolamine, and N-ethylethanolamine. Among them, the alkanolamines are preferable because they can impart good water dispersion stability to polyurethane molecules, and 2-aminoethanol and diethanolamine are particularly preferable from the viewpoint of supply stability and the like.

The diamine compound is not particularly limited, and well-known general diamine compounds can be used alone or in combination of two or more. Examples of the diamine compound include low-molecular-weight diamines such as ethylenediamine and propylenediamine in which an alcoholic hydroxyl group of the above-exemplified low-molecular-weight diol is substituted with an amino group; polyetherdiamines such as polyoxypropylenediamine and polyoxyethylenediamine; alycyclic diamines such as menthene diamine, isophoronediamine, norbornenediamine, bis (4-amino-3-methyldicyclohexyl)methane, diaminodicyclohexylmethane, bis(aminomethyl)cyclohexane, and 3,9-bis(3-aminopropyl)2,4,8,10-tetraoxaspiro(5,5)undecane;

aromatic diamines such as m-xylenediamine, α-(m/p-aminophenyl)ethylamine, m-phenylenediamine, diaminodiphenylmethane, diaminodiphenylsulfone, diaminodiethyldimethyldiphenylmethane, diaminodiethyldiphenylmethane, dimethylthiotoluenediamine, diethyltoluenediamine, and α,α'-bis(4-aminophenyl)-p-diisopropylbenzen; hydrazine; and dicarboxylic acid dihydrazide compounds which are compounds of the dicarboxylic acid exemplified as the polyvalent carboxylic acid used for the polyester polyol and hydrazine. Among these diamine compounds, low-molecular-weight diamines are preferable from the viewpoint of handleability and the like, and ethylenediamine is particularly preferable.

In the urethane resin particles (A1), an internal branching agent and an internal crosslinking agent which impart a branched structure or a crosslinked structure to polyurethane molecules may be used in addition to the above components. As the internal branching agent and the internal crosslinking agent, trivalent or higher polyols can be suitably used, and examples thereof include trimethylolpropane.

A method for producing the urethane resin particles (A1) is not particularly limited, and a well-known general method can be applied. As the production method, a method in which a prepolymer or a polymer is synthesized in a medium which is inert to a reaction and has a high affinity for water, and then the prepolymer or the polymer is fed to water and dispersed therein is preferable. Examples of the method include (i) a method in which a prepolymer is synthesized from a polyisocyanate component and a polyol component in the above-mentioned medium and the resulting prepolymer is reacted with an amine component which is used as necessary in water, and (ii) a method in which a polymer is synthesized from a polyisocyanate component, a polyol component, and an amine component which is used as necessary, and the resulting polymer is fed to water and dispersed. A neutralizing agent component to be used as necessary may be added to water to be fed in advance or may be added after feeding.

Examples of the medium to be used in the preferred production method, which is inert to the reaction and has a high affinity for water, include acetone, methyl ethyl ketone, dioxane, tetrahydrofuran, and N-methyl-2-pyrrolidone. These media can be usually used in an amount of 3 to 100 mass % based on the total amount of the raw materials used for producing the prepolymer or the polymer.

In the above-mentioned production method, a blending ratio of the polyisocyanate component to the polyol component and the amine component used as necessary is not particularly limited. The blending ratio can be replaced by a molar ratio of the isocyanate group in the polyisocyanate component to the isocyanate-reactive group in the polyol component and the amine component at a stage of the reaction.

An amount of the isocyanate-reactive group in the polyol component and the amine component is preferably in a range from 0.5 to 2.0 mol relative to 1 mol of the isocyanate group in the polyisocyanate component, from the viewpoint of dispersion stability of the resulting aqueous coating composition for automotive exterior, physical properties of a coating film to be formed, adhesion to the base material, and the like.

In addition, it is preferable that a neutralization ratio by the neutralizing agent which is used as necessary be set in a range in which sufficient dispersion stability is imparted to the resulting urethane resin particles (A1). The ratio is preferably in a range from 0.5 to 2.0 times, and more preferably in a range from 0.7 to 1.5 times, relative to 1 mole of carboxyl groups in the urethane resin particles (A1).

An emulsifier such as a surfactant can be used to improve dispersibility of the urethane resin particles (A1).

As the emulsifier, it is possible to use a well-known general anionic surfactant, a nonionic surfactant, a cationic surfactant, an amphoteric surfactant, a polymeric surfactant, a reactive surfactant, and the like. Among them, it is possible to suitably use an anionic emulsifier or a nonionic emulsifier. Examples of the anionic emulsifier include sodium salts and ammonium salts of alkylsulfonic acids, alkylbenzenesulfonic acids, alkylphosphoric acids, and the like. Examples of the nonionic emulsifier include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate, and polyoxyethylene sorbitan monolaurate. Alternatively, a polyoxyalkylene group-containing anionic emulsifier having, per molecule, an anionic group and a polyoxyalkylene group such as a polyoxyethylene group or a polyoxypropylene group may be used, or a reactive anionic emulsifier having, per molecule, an anionic group and a polymerizable unsaturated group may be used.

An average particle size of the urethane resin particles (A1) can be set to a desired average particle size by adjusting particle size control factors such as a composition of raw materials (polyisocyanate component, polyol component, amine component, and the like), a type of the emulsifier, an amount of the emulsifier, a charging distribution of the emulsifier, a type of the neutralizing agent, an amount of the neutralizing agent, and the like.

A solid content of the aqueous dispersion of the urethane resin particles (A1) is not particularly limited, but is preferably in a range from 25 to 55 mass %, more preferably in a range from 30 to 50 mass %, from the viewpoint of increasing the solid content of the resulting aqueous coating composition for automotive exterior and stabilizing the dispersion of the urethane resin particles (A1).

Acrylic Resin Particles (A2) The acrylic resin particles (A2) may be any of those synthesized by emulsion polymerization and those synthesized by solvent polymerization, and both may be used in combination. From the viewpoint of increasing the solid content of the resulting aqueous coating composition for automotive exterior, those synthesized by emulsion polymerization can be suitably used.

The emulsion polymerization can be carried out by a method known in the related art such as a seed polymerization method and a mini-emulsion polymerization method. For example, the emulsion polymerization can be carried out by emulsion polymerization of a polymerizable unsaturated monomer using a polymerization initiator in the presence of an emulsifier.

More specifically, the emulsion polymerization can be carried out by dissolving an emulsifier in water or an aqueous solvent optionally containing an organic medium such as an alcohol, and adding dropwise a polymerizable unsaturated monomer and a polymerization initiator under heating and stirring. A polymerizable unsaturated monomer emulsified in advance using an emulsifier and water may be added dropwise in the same manner.

As the emulsifier, an anionic emulsifier and a nonionic emulsifier exemplified in the description of the urethane resin particles (A1) can be similarly suitably used.

The emulsifier is preferably used at an amount in a range from 0.1 to 15 mass %, more preferably from 0.5 to 10 mass %, and particularly preferably from 1 to 5 mass %, based on the total amount of all monomers that are used.

Examples of the polymerization initiator include organic peroxides, such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropyl carbonate, tert-butyl peroxyacetate, and diisopropylbenzene hydroperoxide; azo compounds, such as azobis(isobutyronitrile), azobis(2,4-dimethylvaleronitrile), azobis(2-methylpropionitrile), azobis(2-methylbutyronitrile), 4,4'-azobis(4-cyanobutanoic acid), dimethyl azobis(2-methylproprionate), azobis[2-methyl-N-(2-hydroxyethyl)-propionamide], and azobis{2-methyl-N-[2-(1-hydroxybutyl)]-propionamide}; and persulfates, such as potassium persulfate, ammonium persulfate, and sodium persulfate. These polymerization initiators can be used alone or in combination of two or more. Furthermore, as necessary, a reducing agent such as sugar, sodium formaldehyde sulfoxylate, or an iron complex may be used in combination with the polymerization initiator to form a redox initiator.

In general, the polymerization initiator is preferably used in an amount in a range approximately from 0.1 to 5 mass %, particularly preferably approximately from 0.2 to 3 mass %, based on the total amount of all monomers to be used. A method of adding the polymerization initiator is not particularly limited, and can be appropriately selected according to a type, an amount, and the like of the polymerization initiator. For example, the polymerization initiator may be contained in a monomer mixture or an aqueous medium in advance, or may be added all at once or added dropwise at the time of polymerization.

For the purpose of adjusting a molecular weight of the resulting acrylic resin particles, a chain transfer agent can be used. Examples of the chain transfer agent include compounds having a mercapto group, and specific examples thereof include lauryl mercaptan, t-dodecyl mercaptan, octyl mercaptan, 2-ethylhexyl thioglycolate, 2-methyl-5-tert-butylthiophenol, mercaptoethanol, thioglycerol, mercaptoacetic acid (thioglycolic acid), mercaptopropionate, and n-octyl-3-mercaptopropionate. When the chain transfer agent is used, an amount thereof is generally preferably in a range from 0.05 to 10 mass %, particularly preferably in a range from 0.1 to 5 mass %, based on the total amount of all monomers to be used.

A reaction temperature is mainly determined by the type of the polymerization initiator. For example, the reaction is preferably performed at 60 to 90° C. in a case of an azo compound, and at 30 to 70° C. in a case of a redox initiator. In general, a reaction time can be from 1 to 8 hours.

As the polymerizable unsaturated monomer, those known in the related art can be used, and for example, the following monomers (i) to (xxi) and the like can be used. These polymerizable unsaturated monomers can be each used alone or in combination in two or more.

However, in the present invention, a monomer corresponding to "(xviii) Polymerizable unsaturated monomers having a UV-absorbing functional group" described below is excluded from "(x) Hydroxyl group-containing polymerizable unsaturated monomers" described below.

The hydroxyl group-containing polymerizable unsaturated monomers can be used alone or in combination of two or more.

(i) Alkyl or cycloalkyl (meth)acrylates: such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth) acrylate, isostearyl (meth)acrylate, cyclohexyl (meth) acrylate, methylcyclohexyl (meth)acrylate, t-butylcyclohexyl (meth)acrylate, cyclododecyl (meth)acrylate, and tricyclodecanyl (meth)acrylate.

(ii) Polymerizable unsaturated monomers having an isobornyl group: such as isobornyl (meth)acrylate.

(iii) Polymerizable unsaturated monomers having an adamantyl group: such as adamantyl (meth)acrylate.

(iv) Polymerizable unsaturated monomers having a tricyclodecenyl group: such as tricyclodecenyl (meth)acrylate.

(v) Aromatic ring-containing polymerizable unsaturated monomers: such as benzyl (meth)acrylate, styrene, α-methylstyrene, and vinyl toluene.

(vi) Polymerizable unsaturated monomers having an alkoxysilyl group: such as vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane.

(vii) Polymerizable unsaturated monomers having a fluorinated alkyl group: such as perfluoroalkyl (meth)acrylates such as perfluorobutylethyl (meth)acrylate and perfluorooctylethyl (meth)acrylate; and fluoroolefins.

(viii) Polymerizable unsaturated monomers having a photopolymerizable functional group: such as a maleimide group.

(ix) Vinyl compounds: such as N-vinylpyrrolidone, ethylene, butadiene, chloroprene, vinyl propionate, and vinyl acetate.

(x) Hydroxyl group-containing polymerizable unsaturated monomers: such as monoesterified products of a (meth)acrylic acid and a dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate; F-caprolactone modified products of the monoesterified products of a (meth)acrylic acid and a dihydric alcohol having 2 to 8 carbon atoms; N-hydroxymethyl (meth) acrylamide; allyl alcohols; and (meth)acrylates having a polyoxyethylene chain with a hydroxyl group at the molecular terminal.

(xi) Carboxyl group-containing polymerizable unsaturated monomers: such as (meth)acrylic acid, maleic acid, crotonic acid, and β-carboxyethyl (meth)acrylate.

(xii) Nitrogen-containing polymerizable unsaturated monomers: such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylene bis(meth)acrylamide, ethylene bis(meth)acrylamide, and adducts of glycidyl (meth)acrylate and amine compounds.

(xiii) Polymerizable unsaturated monomer having two or more polymerizable unsaturated groups per molecule: such as allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra (meth)acrylate, glycerol di(meth)acrylate, 1,1,1-tris (hydroxymethyl)ethane di(meth)acrylate, 1,1,1-tris(hydroxymethyl)ethane tri(meth)acrylate, 1,1,1-tris (hydroxymethyl)propane tri(meth)acrylate, triallylisocyanurate, diallylterephthalate, and divinylbenzene.

(xiv) Epoxy group-containing polymerizable unsaturated monomers: such as glycidyl (meth)acrylate, β-methylglycidyl (meth)acrylate, 3,4-epoxycyclohexyl methyl (meth)acrylate, 3,4-epoxycyclohexyl ethyl(meth)acrylate, 3,4-epoxycyclohexylpropyl (meth)acrylate, and allyl glycidyl ether.

(xv) (Meth)acrylates having a polyoxyethylene chain with an alkoxy group at the molecular terminal.

(xvi) Polymerizable unsaturated monomers having a sulfonic acid group: such as 2-acrylamido-2-methylpropane sulfonic acid, 2-sulfoethyl (meth)acrylate, allyl sulfonic acid, 4-styrene sulfonic acid, and sodium salts and ammonium salts of these sulfonic acids.

(xvii) Polymerizable unsaturated monomers having a phosphate group: such as acid phosphoxyethyl (meth)acrylate, acid phosphoxypropyl (meth)acrylate, acid phosphoxypoly(oxyethylene)glycol (meth)acrylate, and acid phosphoxypoly(oxypropylene)glycol (meth)acrylate.

(xviii) Polymerizable unsaturated monomers having a UV-absorbing functional group: such as 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy) benzophenone, 2,2'-dihydroxy-4-(3-acryloyloxy-2-hydroxypropoxy)benzophenone, and 2-[2-hydroxy-5-[2-(methacryloyloxy)ethyl]phenyl]-2H-benzotriazole.

(xix) Photostable polymerizable unsaturated monomers: such as 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine.

(xx) Polymerizable unsaturated monomers having a carbonyl group: such as acrolein, diacetone acrylamide, diacetone methacrylamide, acetoacetoxy ethyl methacrylate, formylstyrol, and vinyl alkyl ketones having from 4 to 7 carbon atoms (for example, vinyl methyl ketone, vinyl ethyl ketone, and vinyl butyl ketone).

(xxi) Polymerizable unsaturated monomers having an acid anhydride group: such as maleic anhydride, itaconic anhydride, and citraconic anhydride.

In the present specification, a polymerizable unsaturated group means an unsaturated group that is radically polymerizable. Examples of such polymerizable unsaturated groups include a vinyl group, a (meth)acryloyl group, a (meth)acrylamide group, a vinyl ether group, an allyl group, a propenyl group, an isopropenyl group, and a maleimide group.

In addition, in the present specification, "(meth)acrylate" means an acrylate or a methacrylate. "(Meth)acrylic acid" means acrylic acid or methacrylic acid. "(Meth)acryloyl" means acryloyl or methacryloyl. Furthermore, "(meth)acrylamide" means acrylamide or methacrylamide.

The acrylic resin particles (A2) may be crosslinked resin particles, and the crosslinked resin particles can be produced, for example, by using (xiii) Polymerizable unsaturated monomers having two or more polymerizable unsaturated groups per molecule described above as a monomer component.

As (xiii) Polymerizable unsaturated monomers having two or more polymerizable unsaturated groups per molecule, among them, allyl (meth)acrylate, ethylene glycol di(meth)acrylate, 1,4-butanediol di(meth)acrylate, neopentyl glycol di(meth)acrylate, or 1,6-hexanediol di(meth)acrylate can be suitably used.

A glass transition temperature of the acrylic resin particles (A2) is preferably in a range from −50 to 80° C., more preferably in a range from −50 to 60° C., and particularly preferably in a range from −40 to 60° C., from the viewpoint of smoothness and the like of the coating film to be formed.

In the present specification, the glass transition temperature (Tg) of the acrylic resin is a value calculated by the following equations. $1/Tg(K) = W_1/T_1 + W_2/T_2 + \ldots W_n/T_n$ $Tg(°C.) = Tg(K) - 273$ where $W_1, W_2, \ldots W_n$ are mass fractions of the respective monomers, and $T_1, T_2, \ldots T_n$ are glass transition temperatures $Tg(K)$ of homopolymers of the respective monomers.

Note that the glass transition temperatures of the homopolymers of the respective monomers each are a value in accordance with POLYMER HANDBOOK Fourth Edition, edited by J. Brandrup, E. h. Immergut, E. A. Grulke (1999), and the glass transition temperature of a monomer not described in this literature is a static glass transition temperature produced by synthesizing a homopolymer of the monomer to have a weight average molecular weight of about 50000.

The static glass transition temperature can be measured as follows. Using a differential scanning calorimeter "DSC-50Q" (available from Shimadzu Corporation, trade name), a sample is placed into a measuring cup of a differential scanning calorimeter and vacuum suction is performed to completely remove the solvent; then, the change in heat quantity is measured in a range from −100° C. to 150° C. at a temperature increase rate of 3° C./min, and the change point of the initial baseline on the low-temperature side is assumed as the static glass transition temperature.

The average particle size of the acrylic resin particles (A2) can be set to a desired average particle size by adjusting particle size control factors such as a composition of monomers, a type of the emulsifier, an amount of the emulsifier, a charging distribution of the emulsifier, a type of the neutralizing agent, and an amount of the neutralizing agent.

A solid content of the aqueous dispersion of the acrylic resin particles (A2) is not particularly limited. The solid content is preferably in a range from 20 to 70 mass %, more preferably in a range from 25 to 65 mass %, and even particularly preferably in a range from 30 to 60 mass %, from the viewpoint of increasing the solid content of the resulting aqueous coating composition for automotive exterior and stabilizing dispersion of the acrylic resin particles (A2).

Acrylic-Urethane Composite Resin Particles (A3)

The acrylic-urethane composite resin particles (A3) are composite resin particles in which a urethane resin component and an acrylic resin component are present in the same micelle. In the aqueous coating composition for automotive exterior of the present invention, a form of the acrylic-urethane composite resin particles (A3) is not particularly limited.

From the viewpoint of chipping resistance of a coating film to be formed, washability of the resulting aqueous coating composition for automotive exterior (for example, ease of removing stains when a coating machine is washed to remove the coating composition adhering to the coating machine after the coating operation is finished), and the like, a constituent ratio of the urethane resin component and the acrylic resin component in the acrylic-urethane composite resin particles (A3) is preferably 5/95 to 90/10 (mass ratio), and more preferably 10/90 to 80/20, in urethane resin/acrylic resin.

The urethane resin component can be synthesized using, for example, a polyisocyanate compound, a polyol, and a compound having both an active hydrogen group and an ion-forming group.

The urethane resin component can be synthesized, for example, as follows.

A polyisocyanate compound, a polyol, and a compound having both an active hydrogen group and an ion-forming group are reacted in a (meth)acrylate monomer having no reactivity with an isocyanate group to form a urethane prepolymer having an isocyanate group terminal or a hydroxyl group terminal.

Here, the polyol preferably contains at least one type of polyol selected from the group consisting of polyester polyol, polyether polyol, and polycarbonate polyol, from the viewpoint of cost, chipping resistance of a coating film to be formed, and the like.

In this reaction, the total amount of the isocyanate-reactive groups of the polyol and the compound having both an active hydrogen group and an ion-forming group is preferably in a range from 0.3 to 1.2 mol relative to 1 mol of the isocyanate group in the polyisocyanate compound.

The pre-polymerization reaction is preferably performed in a range from 50 to 100° C. To prevent thermal polymerization of the (meth)acrylate monomer described below, a polymerization inhibitor such as p-methoxyphenol is preferably added to the (meth)acrylic monomer in a range from about 20 to 3000 ppm in air.

In addition, at the time, as a catalyst of the urethanization reaction, an organotin compound such as dibutyltin dilaurate, dibutyltin dioctoate, or stannous octoate; an organic bismuth compound such as bismuth (III) tris(2-ethylhexanoate); or a tertiary amine compound such as triethylamine or triethylenediamine can be used as necessary. In this manner, a (meth)acrylate monomer solution of an isocyanate group-terminated urethane prepolymer can be produced.

As the polyisocyanate compound and the polyol, the polyisocyanate components and the polyols exemplified in the description of the urethane resin particles (A1) can be used in the same manner.

Examples of the compound having both an active hydrogen group and an ion-forming group include a compound having two or more hydroxyl groups and one or more carboxyl groups per molecule and a compound having two or more hydroxyl groups and one or more sulfonic acid groups per molecule. This compound acts as an ion-forming group in the urethane resin.

Examples of the compound having two or more hydroxyl groups and one or more carboxyl groups per molecule include: alkanol carboxylic acids such as dimethylolpropionic acid, dimethylolacetic acid, dimethylolbutanoic acid, dimethylolheptanoic acid, dimethylolnonanoic acid, 1-carboxy-1,5-pentylenediamine, dihydroxybenzoic acid, and 3,5-diaminobenzoic acid; and half ester compounds of polyoxypropylenetriol with maleic anhydride or phthalic anhydride.

Examples of the compound having two or more hydroxyl groups and one or more sulfonic acid groups per molecule include 2-sulfonic acid-1,4-butanediol, 5-sulfonic acid-di-β-hydroxyethyl isophthalate, and N,N-bis(2-hydroxyethyl) aminoethylsulfonic acid.

In a case of using a compound having two or more hydroxyl groups and one or more carboxyl groups per molecule and a compound having two or more hydroxyl groups and one or more sulfonic acid groups per molecule as the compound having both an active hydrogen group and an ion-forming group, the neutralizing agent exemplified in the description of the resin particles (A) can be used as a neutralizing agent to form a salt and hydrophilize the resin. The particle size can be adjusted by the neutralization ratio with respect to the carboxyl group or the sulfonic acid.

The neutralizing agent is preferably triethylamine or dimethylethanolamine from the viewpoint of water resistance of the coating film to be formed.

The acrylic resin component in the acrylic-urethane composite resin particles (A3) can be produced by polymerizing a polymerizable unsaturated monomer.

As the polymerizable unsaturated monomer, the polymerizable unsaturated monomers described in relation to the acrylic resin particles (A2) can be similarly used. The polymerizable unsaturated monomers can be used alone or in combination of two or more.

The acrylic resin component of the acrylic-urethane composite resin particles (A3) has a hydroxyl value preferably in a range from 1 to 200 mg KOH/g, more preferably in a range from 2 to 180 mg KOH/g, and even particularly preferably in a range from 5 to 170 mg KOH/g, from the viewpoint of water resistance and the like of the coating film to be formed.

The acrylic resin component of the acrylic-urethane composite resin particles (A3) has an acid value preferably in a range from 0 to 60 mg KOH/g, more preferably in a range from 0 to 50 mg KOH/g, and even particularly preferably in a range from 0 to 40 mg KOH/g, from the viewpoint of smoothness, sharpness, and the like of the coating film to be formed.

Furthermore, the acrylic resin component of the acrylic-urethane composite resin particles (A3) has a glass transition temperature preferably in a range from −60 to 60° C., more preferably in a range from −55 to 55° C., and even particularly preferably in a range from −50 to 50° C., from the viewpoint of smoothness and the like of the coating film to be formed.

In a case where a (meth)acrylate monomer is further added to the (meth)acrylate monomer solution of the urethane prepolymer produced by forming the urethane prepolymer in the (meth)acrylate monomer having no reactivity with an isocyanate group, the time of addition is not particularly limited, and the (meth)acrylate monomer can be added at any time before or after a process of neutralizing the urethane prepolymer described below. It is also possible to disperse the neutralized urethane prepolymer in water and then add the (meth)acrylate monomer to the dispersion liquid.

Furthermore, when a (meth)acrylic monomer having an active hydrogen group reactive with an isocyanate group is reacted with a (meth)acrylic monomer solution of an isocyanate group-terminated urethane prepolymer, it is possible to use a grafting reaction of the urethane prepolymer and the acrylic resin in the subsequent process of polymerizing the (meth)acrylic monomer.

A typical method for producing the acrylic-urethane composite resin particles (A3) is described below, but the method is not limited thereto, and a known method for producing acrylic-urethane composite resin particles in the related art can also be used.

The method until production of the urethane prepolymer of the urethane resin component is as described above. In this method, the urethane prepolymer is synthesized in a polymerizable unsaturated monomer ((meth)acrylic monomer) having no reactivity with an isocyanate group.

Here, the polymerizable unsaturated monomer ((meth)acrylate monomer) having no reactivity with an isocyanate group becomes a part or all of a constituent monomer component of the acrylic resin component (a central portion (core portion) of the acrylic resin component in a case where the acrylic resin component has a core-shell structure).

Subsequently, a neutralizing agent is added to the polymerization reaction solution, and then water is added to cause phase inversion between an oil layer and an aqueous layer, followed by dispersion in water to produce an aqueous dispersion liquid. A polymerization initiator is added to the aqueous dispersion liquid to carry out a polymerization reaction of the polymerizable unsaturated monomer ((meth)acrylate monomer). As necessary, a chain extension reaction of the urethane resin component (urethane prepolymer) (chain extension reaction of isocyanate groups with water) is further performed to complete all polymerization reactions.

As a method for producing the aqueous dispersion liquid described above, the following method can be used as necessary.

In dispersing the polymerizable unsaturated monomer ((meth)acrylate monomer) solution of the urethane prepolymer in water, when a polyoxyalkylene group-containing (meth)acrylate monomer is added, the dispersion in water is improved, and a uniform and more stable aqueous dispersion liquid can be produced. The polyoxyalkylene group-containing (meth)acrylate monomer is a polymerizable unsaturated monomer having a hydroxy group or an alkyleneoxy group having 1 to 3 carbon atoms at a terminal thereof and having a polyoxyethylene group and/or a polyoxypropylene group.

In addition, a small amount of an emulsifier can be used in combination from the viewpoint of improving stability of the aqueous dispersion liquid of the polymerizable unsaturated monomer ((meth)acrylate monomer) solution of the urethane prepolymer and stability during polymerization of the polymerizable unsaturated monomer ((meth)acrylate monomer).

As the emulsifier, for example, anionic surfactants and nonionic surfactants are preferable, and the emulsifiers exemplified in the description of the urethane resin particles (A1) can be similarly used.

The unsaturated monomer ((meth)acrylate monomer) solution of the urethane prepolymer can be dispersed in water by dispersion with an ordinary stirrer, but it is possible to use a homomixer, a homogenizer, a disper, a line mixer, or the like to produce a uniform aqueous dispersion liquid with a finer particle size.

After the aqueous dispersion liquid of the polymerizable unsaturated monomer ((meth)acrylate monomer) solution of the urethane prepolymer is produced as described above, a polymerization initiator is added thereto and the temperature is raised within a range of the polymerization temperature of the polymerizable unsaturated monomer ((meth)acrylate monomer) to perform chain extension of the urethane prepolymer with water and polymerization of the polymerizable unsaturated monomer ((meth)acrylic monomer) as necessary, whereby an aqueous dispersion of the acrylic-urethane composite resin particles composed of the urethane resin component and the acrylic resin component can be produced.

The polymerization reaction in the aqueous dispersion liquid can be carried out by a known radical polymerization reaction. As the polymerization initiator, either a water-soluble initiator or an oil-soluble initiator can be used. In a case where an oil-soluble initiator is used, the oil-soluble initiator is preferably added to the unsaturated monomer ((meth)acrylate monomer) solution of the urethane prepolymer before the aqueous dispersion liquid is prepared.

The polymerization initiator is usually preferably used in a range from 0.05 to 5 mass % with respect to the total amount of the polymerizable unsaturated monomer ((meth)acrylic monomer).

As the polymerization initiator, the polymerization initiators exemplified in the description of the acrylic resin particles (A2) can be similarly used. The polymerization initiators can be used alone or in combination of two or more.

An organic or inorganic peroxide can also be used in combination with a reducing agent as a redox initiator. Examples of the reducing agent include L-ascorbic acid, L-sorbic acid, sodium metabisulfite, ferric sulfate, ferric chloride, and Rongalit.

The method for adding the polymerization initiator is not particularly limited, and can be appropriately selected according to a type, an amount, and the like of the polymerization initiator. For example, the polymerization initiator may be contained in a monomer mixture or an aqueous medium in advance, or may be added all at once or added dropwise at the time of polymerization. Alternatively, the addition can be carried out by any method such as a method in which the whole amount is charged all at once at the beginning, a method in which the whole amount is added dropwise over a period of time, or a method in which a part thereof is charged at the beginning and the remainder is added later.

In addition, from the viewpoint of sufficiently carrying out the polymerization reaction and reducing the residual monomer, it is also possible to further carry out the polymerization reaction by adding a polymerization initiator during the polymerization reaction or after once finishing the polymerization. In this case, combination of polymerization initiators can be freely selected.

In general, the polymerization initiator is preferably used in an amount in a range approximately from 0.1 to 5 mass %, more preferably approximately from 0.2 to 3 mass %, based on the total mass of all monomers used.

In the polymerization of the polymerizable unsaturated monomer ((meth)acrylate monomer), a known chain transfer agent can be used for the purpose of adjusting the molecular weight. As the chain transfer agent, those exemplified in the description of the acrylic resin particles (A2) can be similarly used.

The monomer mixture forming the acrylic resin component can contain, as appropriate, components such as the emulsifier, the polymerization initiator, the reducing agent, and the chain transfer agent, as necessary. In addition, the monomer mixture, while it can be added dropwise as is, is preferably added dropwise as a monomer emulsion after being dispersed in an aqueous medium. The particle size of the monomer emulsion in this case is not particularly limited.

In a case where the chain extension of the urethane prepolymer is performed, a chain extender other than water can be added as necessary to react the urethane prepolymer with the chain extender. As the chain extender, a known chain extender having active hydrogen can be used. Specific examples thereof include diamine compounds such as ethylenediamine, hexamethylenediamine, cyclohexanediamine, cyclohexylmethanediamine, and isophoronediamine, and hydrazine.

Compositions of the resin components (acrylic resin component, urethane resin component), reaction conditions, and the like are adjusted in the aqueous dispersion of the acrylic-urethane composite resin particles, so that it is possible to produce the aqueous dispersion of the acrylic-urethane composite resin particles having a desired form such as a core-shell structure, or a form in which the urethane resin component and the acrylic resin component are partially or entirely mixed.

In a case where the acrylic resin component has a core-shell structure in which the central portion (core) and the outer shell portion (shell) have different resin compositions, two or more polymerizable unsaturated monomers ((meth)acrylate monomers) having different compositions are used to perform a reaction in multiple stages (for example, unsaturated monomer mixtures having different compositions are prepared, and added in multiple stages for each polymerizable unsaturated monomer mixture to perform a reaction), so that it is possible to produce an aqueous dispersion of the acrylic-urethane composite resin particles having a core-shell structure in which the central portion (core) and the outer shell portion (shell) have different resin compositions as the acrylic resin component.

In the aqueous dispersion of the acrylic-urethane composite resin particles having a core-shell structure in which the central portion (core) and the outer shell portion (shell) have different resin compositions as the acrylic resin component, in particular, the central portion (core) of the acrylic resin component may contain a urethane resin component.

The average particle size of the acrylic-urethane composite resin particles (A3) can be set to a desired average particle size by adjusting particle size control factors such as a composition of raw materials (acrylic resin component, urethane resin component, and the like), a type of the emulsifier, an amount of the emulsifier, a charging distribution of the emulsifier, a type of the neutralizing agent, an amount of the neutralizing agent, and the like.

The solid content of the aqueous dispersion of the acrylic-urethane composite resin particles (A3) is not particularly limited, but is preferably in a range from 25 to 60 mass %, more preferably in a range from 30 to 55 mass %, from the viewpoint of increasing the solid content of the resulting aqueous coating composition for automotive exterior and stabilizing the dispersion of the acrylic-urethane composite resin particles.

Polyester Resin Particles (A4) The polyester resin particles (A4) are produced by condensing a polyol having two or more hydroxyl groups as an alcohol component and a polycarboxylic acid having two or more carboxyl groups as an acid component.

As the polyol, a polyhydric alcohol having two or more hydroxyl groups per molecule can be suitably used. Examples of the polyhydric alcohols include dihydric alcohols, such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyl trimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentylglycol, 1,4-cyclohexane dimethanol, tricyclodecane dimethanol, neopentylglycol hydroxypivalate, hydrogenated bisphenol A, hydrogenated bisphenol F, and dimethylol propionate; polylactone diols produced by adding a lactone compound such as ε-caprolactone to these dihydric alcohols; ester diol compounds such as bis(hydroxyethyl) terephthalate; polyether diol compounds such as an alkylene oxide adduct of bisphenol A, polyethylene glycol, polypropylene glycol, and polybutylene glycol; trihydric and higher polyhydric alcohols, such as glycerin, trimethylol ethane, trimethylol propane, diglycerin, triglycerin, 1,2,6-hexanetriol, pentaerythritol, dipentaerythritol, tris(2-hydroxyethyl)isocyanurate, sorbitol, and mannitol; polylactone polyol compounds produced by adding a lactone compound such as F-caprolactone to these trihydric and higher polyhydric alcohols; and fatty acid ester compounds of glycerin.

In the production of the polyester resin particles (A4), an alcohol component other than the polyol may be used in addition to the polyol described above. Such an alcohol component is not particularly limited, and examples thereof include monoalcohols such as methanol, ethanol, propyl alcohol, butyl alcohol, stearyl alcohol, and 2-phenoxyethanol; and alcohol compounds produced by reacting an acid with a monoepoxy compound such as a propylene oxide, butylene oxide, and "Cardura E10P" (trade name, glycidyl ester of a synthetic highly-branched saturated fatty acid, available from Hexion Inc.).

As the polycarboxylic acid, a compound commonly used in the production of a polyester resin can be used. Examples of such a polycarboxylic acid include an aliphatic polybasic acid, an alicyclic polybasic acid, and an aromatic polybasic acid.

The aliphatic polybasic acid is generally an aliphatic compound having two or more carboxyl groups per molecule, an acid anhydride of the aliphatic compound, and an esterified product of the aliphatic compound. Examples of the aliphatic polybasic acid include aliphatic polybasic carboxylic acids such as succinic acid, glutaric acid, adipic acid, pimelic acid, suberic acid, azelaic acid, sebacic acid, undecanedioic acid, dodecanedioic acid, brassylic acid, octadecanedioic acid, citric acid, and butanetetracarboxylic acid; anhydrides of these aliphatic polybasic carboxylic acids; and esterified products of lower alkyls having 1 to 6 carbon atoms, preferably 1 to 4 carbon atoms, of the aliphatic polybasic carboxylic acids. The aliphatic polybasic acids can be each used alone, or in combination of two or more.

The alicyclic polybasic acid is generally a compound having one or more alicyclic structures and two or more carboxyl groups per molecule, an acid anhydride of the compound, or an esterified product of the compound. The alicyclic structure can be primarily a ring structure of four to six members. Examples of the alicyclic polybasic acid include alicyclic polybasic carboxylic acids such as 1,2-cyclohexane dicarboxylic acid, 1,3-cyclohexane dicarboxylic acid, 1,4-cyclohexane dicarboxylic acid, 4-cyclohexene-1,2-dicarboxylic acid, 3-methyl-1,2-cyclohexane dicarboxylic acid, 4-methyl-1,2-cyclohexane dicarboxylic acid, 1,2,4-cyclohexane tricarboxylic acid, and 1,3,5-cyclohexane tricarboxylic acid; anhydrides of the alicyclic polybasic carboxylic acids; and esterified products of lower alkyls having 1 to 6 carbon atoms, preferably 1 to 4 carbon atoms, of the alicyclic polybasic carboxylic acids. The alicyclic polybasic acids can be each used alone, or in combination of two or more.

The aromatic polybasic acid is generally an aromatic compound having two or more carboxyl groups per molecule, an acid anhydride of the aromatic compound, and an esterified product of the aromatic compound. Examples of the aromatic polybasic acid include: aromatic polybasic carboxylic acids, such as phthalic acid, isophthalic acid, terephthalic acid, naphthalene dicarboxylic acid, 4,4'-biphenyl dicarboxylic acid, trimellitic acid, and pyromellitic acid; anhydrides of these aromatic polybasic carboxylic acids; and esterified products of lower alkyls having 1 to 6 carbon atoms, preferably, 1 to 4 carbon atoms, of these aromatic polybasic carboxylic acids. The aromatic polybasic acids can be each used alone, or in combination of two or more.

Furthermore, in the production of the polyester resin particles (A4), an acid component other than the aliphatic polybasic acid, the alicyclic polybasic acid, and the aromatic polybasic acid can be used in addition to the polycarboxylic acid described above. Such acid component is not particularly limited, and examples include fatty acids, such as coconut oil fatty acid, cotton seed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid; monocarboxylic acids such as lauric acid, myristic acid, palmitic acid, stearic acid, oleic acid, linoleic acid, linolenic acid, benzoic acid, p-tert-butylbenzoic acid, cyclohexanoic acid, and 10-phenyloctadecanoic acid; and hydroxycarboxylic acids such as lactic acid, 3-hydroxybutanoic acid and 3-hydroxy-4-ethoxybenzoic acid. These acid components can be each used alone, or in combination of two or more.

The method for producing the polyester resin particles (A4) is not particularly limited, and the polyester resin particles (A4) can be produced according to a typical method for producing a polyester resin. For example, the polyester resin particles (A4) can be produced by a method in which the alcohol component and the acid component are heated at approximately 150 to 250° C. in a nitrogen stream for approximately 5 to 10 hours to cause an esterification reaction or a transesterification reaction between the acid component and the alcohol component.

To cause the alcohol component and the acid component to be under the esterification reaction or transesterification reaction, these components may be added all at once into a reaction vessel, or one or both components may be added in multiple batches. Also, first, the hydroxyl group-containing polyester resin may be synthesized, and then an acid anhydride may be reacted with the resulting hydroxyl group-containing polyester resin to form a half-ester, thereby producing carboxyl group-containing polyester resin particles. Alternatively, first, the carboxyl group-containing polyester resin may be synthesized, and then the alcohol component may be added to produce the polyester resin particles (A4).

For the esterification or transesterification reaction, a catalyst known per se can be used as a catalyst for promoting the reaction. Examples of such catalysts include dibutyltin oxide, antimony trioxide, zinc acetate, manganese acetate, cobalt acetate, calcium acetate, lead acetate, tetrabutyl titanate, and tetraisopropyl titanate.

Furthermore, the polyester resin particles (A4) can be modified with a fatty acid, a monoepoxy compound, a polyisocyanate compound, or the like during or after preparation of the resin.

Examples of the fatty acid include coconut oil fatty acid, a cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, a dehydrated castor oil fatty acid, and safflower oil fatty acid. Further, as the monoepoxy compound, for example, "Cardura E10P" (trade name, glycidyl ester of a synthetic highly-branched saturated fatty acid, available from Hexion Inc.) can be suitably used.

Moreover, examples of the polyisocyanate compound include: aliphatic diisocyanate compounds, such as lysine diisocyanate, hexamethylene diisocyanate, and trimethylhexane diisocyanate; alicyclic diisocyanate compounds, such as hydrogenated xylylene diisocyanate, isophorone diisocyanate, methylcyclohexane-2,4-diisocyanate, methylcyclohexane-2,6-diisocyanate, 4,4'-methylene bis(cyclohexyl isocyanate), and 1,3-(isocyanatomethyl)cyclohexane; aromatic diisocyanate compounds, such as tolylene diisocyanate, xylylene diisocyanate, and diphenylmethane diisocyanate; organic polyisocyanates themselves, such as trivalent and higher-valent polyisocyanates such as lysine triisocyanate; adducts of each of these organic polyisocyanates with a polyhydric alcohol, a low molecular weight polyester resin, water, or the like; and cyclized polymers (for example, isocyanurate) and biuret-type adducts of each of these organic polyisocyanates. These polyisocyanate compounds can be used alone, or two or more types thereof can be mixed and used.

The number average molecular weight of the polyester resin particles (A4) is preferably in a range from 500 to 50000, more preferably in a range from 1000 to 30000, and even particularly preferably in a range from 1200 to 10000, from the viewpoint of adhesion of the coating film to be formed.

In the present specification, the average molecular weight can be measured using, as a gel permeation chromatograph, "HLC-8120GPC" (trade name, available from Tosoh Corporation), using, as columns, four columns, consisting of one "TSKgel G-4000HXL", two "TSKgel G-3000HXL", and one "TSKgel G-2000HXL" (trade names, all available from Tosoh Corporation), and using, as a detector, a differential refractometer under conditions of tetrahydrofuran as a mobile phase at a measurement temperature of 40° C., and a flow rate of 1 mL/min.

The polyester resin particles (A4) has a glass transition temperature (Tg) preferably in a range from −30° C. to 50° C., more preferably in a range from −25° C. to 40° C., and particularly preferably in a range from −20° C. to 30° C., from the viewpoint of water resistance and adhesion of the coating film to be formed.

In the present specification, the glass transition temperature (Tg) of the polyester resin is a static glass transition temperature. The static glass transition temperature can be measured as follows. Using a differential scanning calorimeter "DSC-50Q" (available from Shimadzu Corporation, trade name), a sample is placed into a measuring cup of a differential scanning calorimeter and vacuum suction is performed to completely remove the solvent; then, the change in heat quantity is measured in a range from −100° C. to 150° C. at a temperature increase rate of 3° C./min, and the change point of the initial baseline on the low-temperature side is assumed as the static glass transition temperature.

The polyester resin particles (A4) are usually a binder having an acid group, and in a case of being dispersed in water, it is preferable to perform neutralization with a neutralizing agent to facilitate mixing and dispersion with water from the viewpoint of improving aqueous dispersibility. As the neutralizing agent, the neutralizing agents described in the description of the resin particles (A) can be used.

In addition, in a case of performing neutralization with the neutralizing agent, the neutralization ratio is preferably set in a range in which sufficient dispersion stability is imparted to the polyester resin particles to be used, and is preferably 0.5 to 2.0 equivalent, and more preferably 0.7 to 1.5 equivalent based on the number of moles of the carboxyl group in the polyester resin particles.

Acrylic-Polyester Composite Resin Particles (A5) The acrylic-polyester composite resin particles (A5) of the present invention are not particularly limited, and acrylic-polyester composite resin particles produced by a known method can be used. Examples of the known method include a method of polymerizing a mixture of an unsaturated group-containing polyester resin and a polymerizable unsaturated monomer, and a method by an esterification reaction between a polyester resin and an acrylic resin.

The method of producing the acrylic-polyester composite resin particles (A5) by polymerizing a mixture of an unsaturated group-containing polyester resin and a polymerizable unsaturated monomer is a method of acrylic-modifying the polyester resin by polymerizing a polymerizable unsaturated monomer using an unsaturated group in the polyester resin as a graft point. The method for producing the unsaturated group-containing polyester resin is not particularly limited, but for example, a polyester resin may be synthesized by a common method and a hydroxyl group of the polyester resin may be reacted with an acid anhydride group-containing polymerizable unsaturated monomer to give a graft point to the polyester resin, or the unsaturated group-containing polyester resin may be synthesized by an esterification reaction or a transesterification reaction between an acid component containing a polybasic acid having an unsaturated group and an alcohol component. From the viewpoint of simplicity of synthesis, it is preferable to synthesize the unsaturated group-containing polyester resin by a method using an esterification reaction or a transesterification reaction between an acid component containing a polybasic acid having an unsaturated group and an alcohol component. Among them, it is particularly preferable to use an acid component containing an acid anhydride group-containing polymerizable unsaturated monomer as the polybasic acid having an unsaturated group from the viewpoint of storage stability and the like.

The acid anhydride group-containing polymerizable unsaturated monomer is a compound having one or more acid anhydride groups and one or more unsaturated groups per molecule.

Specific examples thereof include unsaturated dicarboxylic anhydrides such as: compounds having less than 6 carbon atoms such as maleic anhydride, itaconic anhydride, fumaric anhydride, citraconic anhydride, mesaconic anhydride, 2-pentenedioic anhydride, methylenesuccinic anhydride, and acetylenedicarboxylic anhydride; and compounds having 6 or more carbon atoms such as tetrahydrophthalic anhydride, allylmalonic anhydride, isopropylidenesuccinic anhydride, 2,4-hexadienedioic anhydride, and 4-cyclohexene-1,2-dicarboxylic anhydride. Among them, maleic anhydride is preferable from the viewpoint of reactivity and the like.

Examples of an acid component other than the acid anhydride group-containing polymerizable unsaturated monomer include an aliphatic polybasic acid, an alicyclic polybasic acid, and an aromatic polybasic acid.

The aliphatic polybasic acid is generally an aliphatic compound having two or more carboxyl groups per molecule, an acid anhydride of the aliphatic compound, and an esterified product of the aliphatic compound. Examples of the aliphatic polybasic acid include the compounds exemplified in the description of the aliphatic polybasic acid in the description of the polyester resin particles (A4). The aliphatic polybasic acids can be used alone, or in combination of two or more.

The alicyclic polybasic acid is generally a compound having one or more alicyclic structures and two or more carboxyl groups per molecule, an acid anhydride of the compound, or an esterified product of the compound. The alicyclic structure is primarily a ring structure of four to six members. Examples of the alicyclic polybasic acid include the compounds exemplified in the description of the alicyclic polybasic acid in the description of the polyester resin particles (A4). The alicyclic polybasic acids can be used alone, or in combination of two or more.

As the alicyclic polybasic acids, from the viewpoint of smoothness and the like of the coating film to be formed, 1,2-cyclohexane dicarboxylic acid, 1,2-cyclohexane dicarboxylic anhydride, 1,3-cyclohexane dicarboxylic acid, 1,4-cyclohexane dicarboxylic acid, or 4-cyclohexene-1,2-dicarboxylic acid is preferably used, and among these, 1,2-cyclohexane dicarboxylic acid and/or 1,2-cyclohexane dicarboxylic anhydride is more preferably used.

The aromatic polybasic acid is generally an aromatic compound having two or more carboxyl groups and an esterified compound of the aromatic compound, and examples thereof include the compounds exemplified in the description of the aromatic polybasic acid in the description of the polyester resin particles (A4). The aromatic polybasic acids can be used alone, or in combination of two or more.

As the aromatic polybasic acid, phthalic acid, isophthalic acid, or trimellitic acid is preferably used.

In addition, an acid component other than the aliphatic polybasic acid, the alicyclic polybasic acid, and the aromatic polybasic acid can be used. Such an acid component is not particularly limited, and examples thereof include the compounds exemplified in the description of the acid components in the description of the polyester resin particles (A4). These acid components can be used alone or in combination of two or more.

As the alcohol component, a polyhydric alcohol having two or more hydroxyl groups per molecule can be used. Examples of the polyhydric alcohol include the compounds exemplified in the description of the polyhydric alcohol in the description of the polyester resin particles (A4).

Furthermore, an alcohol component other than the polyhydric alcohols described above can be used. The alcohol component is not particularly limited, and examples thereof include the compounds exemplified in the description of the alcohol component other than the polyhydric alcohol in the description of the polyester resin particles (A4).

Other examples of the method for producing the unsaturated group-containing polyester resin include a method in which an unsaturated fatty acid such as oleic acid or myristic acid (each of which is a compound having 6 or more carbon atoms) is used as a part of the acid component in addition to the acid component containing a polybasic acid and a polyhydric alcohol and the like. In such a method, an unsaturated group of the unsaturated fatty acid is used as a graft point.

The method for producing an unsaturated group-containing polyester resin is not particularly limited, and the unsaturated group-containing polyester resin can be produced according to a typical method. For example, the acid component and the alcohol component are heated at approximately 150 to 250° C. in a nitrogen stream for approximately 5 to 10 hours, and an esterification reaction or a transesterification reaction between the acid component and the alcohol component proceeds, whereby it is possible to produce the unsaturated group-containing polyester resin.

In the esterification reaction or transesterification reaction between the acid component and the alcohol component, these components may be added all at once, or one or both components may be added in multiple batches or continuously. Also, first, the unsaturated group-containing polyester resin may be synthesized, and then the resulting unsaturated group-containing polyester resin may be half-esterified to produce an unsaturated group-, carboxyl group- and hydroxyl group-containing polyester resin. In addition, first, an unsaturated group- and carboxyl group-containing polyester resin may be synthesized, and then the alcohol component may be added to produce an unsaturated group-, carboxyl group-, and hydroxyl group-containing polyester resin.

Furthermore, the unsaturated group-containing polyester resin can be modified with a fatty acid, an oil and fat, a monoepoxy compound, a polyisocyanate compound, or the like during or after preparation of the resin.

As the polymerizable unsaturated monomer to be mixed and polymerized with the unsaturated group-containing polyester resin produced as described above, for example, the polymerizable unsaturated monomers exemplified in the description of the acrylic resin particles (A2) can be used. The polymerizable unsaturated monomers can be used alone or in combination of two or more.

The acrylic-polyester composite resin particles (A5) can be synthesized, for example, by copolymerizing the unsaturated group-containing polyester resin and the polymerizable unsaturated monomer by a known method.

Specifically, for example, the acrylic-polyester composite resin particles (A5) can be synthesized by adding an unsaturated group-containing polyester resin, a polymerizable unsaturated monomer, a polymerization initiator, and a chain transfer agent as necessary to a reaction vessel, and heating them at 90 to 160° C. for 1 to 5 hours. From the viewpoint of controlling the reaction temperature, it is also possible to charge the unsaturated group-containing polyester resin in the reaction vessel in advance and then add the other raw materials thereto over time.

As the polymerization initiator, an organic peroxide or an azo compound can be used. Examples of the polymerization initiator include the polymerization initiators exemplified in the description of the acrylic resin particles (A2). Examples of the chain transfer agent include the chain transfer agents exemplified in the description of the acrylic resin particles (A2).

On the other hand, a method for producing the acrylic-polyester composite resin particles (A5) by an esterification reaction between a polyester resin and an acrylic resin is a method causing a transesterification reaction between a part of the polyester resins and the acrylic resin to proceed for grafting.

With regard to proportions of the acrylic portion and the polyester portion in the acrylic-polyester composite resin particles (A5), from the viewpoint of physical properties of the coating film to be formed, the proportion of the acrylic portion is preferably in a range from 5 to 40 mass %, more preferably in a range from 5 to 30 mass %, and even particularly preferably in a range from 5 to 25 mass %, and the proportion of the polyester portion is preferably in a range from 60 to 95 mass %, more preferably in a range from 70 to 95 mass %, and even particularly preferably in a range from 75 to 95 mass %, with respect to the acrylic-polyester composite resin particles (the total amount of the acrylic portion and the polyester portion).

The acrylic-polyester composite resin particles (A5) can be made into an aqueous dispersion liquid by neutralization and dispersion in water. As the neutralizing agent, an amine compound and ammonia can be used. Examples of the amine compound include triethylamine, triethanolamine, dimethylethanolamine, diethylethanolamine, and morpholine. Among them, triethylamine and dimethylethanolamine can be suitably used. The degree of neutralization is not particularly limited, but is usually preferably in a range from 0.3 to 1.0 equivalents based on the number of moles of the acid group in the resin.

An aqueous medium of the aqueous dispersion liquid of the acrylic-polyester composite resin particles (A5) may be water alone or a mixture of water and an organic solvent.

The organic solvent is preferably an alcohol-based solvent, an ether-based solvent, or the like. Specific examples thereof include alcohol-based solvents such as n-butanol; and ether-based solvents such as ethylene glycol monobutyl ether, ethylene glycol monoisopropyl ether, ethylene glycol monomethyl ether, propylene glycol monomethyl ether, and diethylene glycol monoethyl ether. Ester-based solvents such as ethyl acetate and butyl acetate, ketone-based solvents such as methyl ethyl ketone and cyclohexanone, and aromatic hydrocarbon-based solvents such as toluene and xylene can also be used.

The acrylic-polyester composite resin particles (A5) can be neutralized and dispersed in the aqueous medium in accordance with a common method, and examples of the method include a method in which the acrylic-polyester composite resin particles are gradually added to an aqueous medium containing a neutralizing agent with stirring, a method in which the acrylic-polyester composite resin particles are neutralized with a neutralizing agent and then the aqueous medium is added thereto with stirring, and a method in which the neutralized product is added to an aqueous medium.

In the present invention, a content of the resin particles (A) is preferably in a range from 30 to 85 parts by mass, more preferably in a range from 40 to 75 parts by mass, and even particularly preferably in a range from 45 to 70 parts by mass, based on 100 parts by mass of the resin solid content in the aqueous coating composition for automotive exterior, from the viewpoint of increasing the solid content of the resulting aqueous coating composition for automotive exterior, weather resistance and hardness of the coating film to be formed, and the like.

Crosslinking Agent (B)

The crosslinking agent (B) is not particularly limited. For example, in a case where the resin particles (A) have a crosslinking reactive group, a crosslinking agent having reactivity with the crosslinking reactive group can be used depending on the crosslinking reactive group. Above all, preferably, the resin particles (A) have a hydroxyl group as a crosslinking reactive group and the crosslinking agent (B) is a compound having reactivity with the hydroxyl group.

Examples of the crosslinking agent (B) include known crosslinking agents, and specific examples thereof include an amino resin (B1), a polyisocyanate compound (B2), a blocked polyisocyanate compound (B3), a polyhydrazide compound, a polysemicarbazide compound, a carbodimide compound, an oxazoline-group-containing compound, an epoxy compound, and a polycarboxylic acid. Among them, the crosslinking agent (B) preferably contains at least one selected from the group consisting of the amino resin (B1), the polyisocyanate compound (B2), and the blocked polyisocyanate compound (B3). The crosslinking agent (B) may be used alone or in combination of two or more.

Amino Resin (B1) As the amino resin (B1), a partially methylolated amino resin or a completely methylolated amino resin produced by a reaction of an amino component with an aldehyde component can be used can be used. Examples of the amino component include melamine, urea, benzoguanamine, acetoguanamine, steroguanamine, spiroguanamine, and dicyandiamide.

Examples of the aldehyde component include formaldehyde, paraformaldehyde, acetaldehyde, and benzaldehyde.

It is also possible to use one produced by partially or completely etherifying methylol groups of the methylolated amino resin with an appropriate alcohol. Examples of the alcohol to be used for the etherification include methyl alcohol, ethyl alcohol, n-propyl alcohol, isopropyl alcohol, n-butyl alcohol, isobutyl alcohol, 2-ethyl-1-butanol, and 2-ethyl-1-hexanol.

As the amino resin (B1), a melamine resin is preferable. In particular, the melamine resin is preferably a methyl-etherified melamine resin produced by partially or fully etherifying methylol groups of a partially or fully methylolated melamine resin with methyl alcohol, an ethyl-etherified melamine resin produced by partially or fully etherifying methylol groups of a partially or fully methylolated melamine resin with ethyl alcohol, a butyl-etherified melamine resin produced by partially or fully etherifying methylol groups of a partially or fully methylolated melamine resin with butyl alcohol, or a methyl-butyl mixed etherified melamine resin produced by partially or fully etherifying methylol groups of a partially or fully methylolated melamine resin with methyl alcohol and butyl alcohol, and more preferably a methyl-butyl mixed etherified melamine resin.

The melamine resin has a weight average molecular weight of preferably 450 to 6000, more preferably 500 to 4000, and even particularly preferably 550 to 3000.

As the melamine resin, a commercially available product can be used. Examples of trade names of the commercially available products include "CYMEL 202", "CYMEL 203", "CYMEL 211", "CYMEL 238", "CYMEL 251", "CYMEL 254", "CYMEL 303", "CYMEL 325", "CYMEL 327", "CYMEL 350", "CYMEL 370", "CYMEL 385", "CYMEL 1156", "CYMEL 1158", and "CYMEL 1130" (all available from Allnex Japan Inc.), and "U-VAN 20SE60" and "U-VAN 28-60" (all available from Mitsui Chemicals, Inc.).

In a case where the melamine resin is used as the crosslinking agent (B), as necessary, a sulfonic acid such as p-toluenesulfonic acid, dodecylbenzenesulfonic acid, or dinonylnaphthalenesulfonic acid; a neutralized salt of the sulfonic acid with an amine; a neutralized salt of a phosphoric acid ester compound with an amine; or the like can be used as a curing catalyst.

The amino resin (B1) can be used, for example, as a crosslinking agent for a resin containing a hydroxyl group.
Polyisocyanate Compound (B2)

The polyisocyanate compound (B2) is a compound having two or more isocyanate groups per molecule.

Examples of the polyisocyanate compound (B2) include aliphatic polyisocyanates, alicyclic polyisocyanates, aromatic-aliphatic polyisocyanates, aromatic polyisocyanates, and derivatives of the polyisocyanates. These can be each used alone or in combination of two or more.

Examples of the aliphatic polyisocyanates include: aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); and aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of the alicyclic polyisocyanates include: alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (commonly known as isophorone diisocyanate), methyl-2,4-cyclohexane diisocyanate, methyl-2,6-cyclohexane diisocyanate, 1,3- or 1,4-bis(isocyanatomethyl)cyclohexane (commonly known as hydrogenated xylylene diisocyanate) or its mixture, and norbornane diisocyanate; and alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1) heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo (2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane, and 6-(2-isocyanatoethyl)-2-isocyanatomethyl-2-(3-isocyanatopropyl)-bicyclo(2.2.1)heptane.

Examples of the aromatic-aliphatic polyisocyanates include: aromatic-aliphatic diisocyanates, such as 1,3- or 1,4-xylylene diisocyanate or its mixture, ω,ω'-diisocyanato-1,4-diethylbenzene, and 1,3- or 1,4-bis(1-isocyanato-1-methylethyl)benzene (commonly known as tetramethylxylylene diisocyanate) or its mixture; and aromatic-aliphatic triisocyanates, such as 1,3,5-triisocyanatomethylbenzene.

Examples of the aromatic polyisocyanates include: aromatic diisocyanates, such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or its mixture, 2,4- or 2,6-tolylene diisocyanate or its mixture, 4,4'-toluidine diisocyanate, and 4,4'-diphenyl ether diisocyanate; aromatic triisocyanates, such as triphenylmethane-4,4',4"-triisocyanate, 1,3,5-triisocyanatobenzene, and 2,4,6-triisocyanatotoluene; and aromatic tetraisocyanates, such as 4,4'-diphenylmethane-2,2',5,5'-tetraisocyanate.

Examples of the derivatives of the polyisocyanates include dimers, trimers, biuret, allophanate, uretdione, uretonimine, isocyanurates, oxadiazinetrione, polymethylene polyphenyl polyisocyanates (crude MDI and polymeric MDI), and crude TDI of the polyisocyanate compounds described above.

The polyisocyanates and their derivatives may each be used alone or in combination of two or more. Among these polyisocyanates, aliphatic diisocyanates, alicyclic diisocyanates, and the derivatives thereof are suitably used alone or in combination of two or more.

In addition, as the polyisocyanate compound (B2), a prepolymer formed by urethanization reaction of the polyisocyanate and its derivative described above with a polyhydric alcohol, a low molecular weight polyester resin, or water under a condition of excess isocyanate groups may be used.

When the polyisocyanate compound (B2) is used as the crosslinking agent (B), an organometallic compound, an acid compound, a basic compound, or the like can be used as a curing catalyst, as necessary.

The polyisocyanate compound (B2) can be used, for example, as a crosslinking agent for a resin containing a hydroxyl group and/or amino group.

Blocked Polyisocyanate Compound (B3)

The blocked polyisocyanate compound (B3) is a compound prepared by blocking isocyanate groups of the polyisocyanate compound (B2) with a blocking agent.

Examples of the blocking agent include: phenolic compounds, such as phenol, cresol, xylenol, nitrophenol, ethylphenol, hydroxydiphenyl, butylphenol, isopropylphenol, nonylphenol, octylphenol, and methyl hydroxybenzoate; lactam-based compounds, such as ε-caprolactam, δ-valerolactam, γ-butyrolactam, and β-propiolactam; aliphatic alcohol-based compounds, such as methanol, ethanol, propyl alcohol, butyl alcohol, amyl alcohol, and lauryl alcohol; ether-based compounds, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohol-based compounds, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oxime-based compounds, such as formamide oxime, acetoamide oxime, acetoxime, methyl ethyl ketoxime, diacetyl monoxime, benzophenone oxime, and cyclohexane oxime; active methylene-based compounds, such as dimethyl malonate, diethyl malonate, ethyl acetoacetate, methyl acetoacetate, and acetylacetone; mercaptan-based compounds, such as butyl mercaptan, tert-butyl mercaptan, hexyl mercaptan, tert-dodecyl mercaptan, 2-mercaptobenzothiazole, thiophenol, methylthiophenol, and ethylthiophenol; acid amide-based compounds, such as acetanilide, acetanisidide, acetotoluide, acrylamide, methacrylamide, acetic amide, stearic amide, and benzamide; imide-based compounds, such as succinimide, phthalimide, and maleimide; amine-based compounds, such as diphenylamine, phenylnaphthylamine, xylidine, N-phenylxylidine, carbazole, aniline, naphthylamine, butylamine, dibutylamine, and butylphenylamine; imidazole-based compounds, such as imidazole and 2-ethylimidazole; urea-based compounds, such as urea, thiourea, ethyleneurea, ethylenethiourea, and diphenylurea; carbamic ester-based compounds, such as phenyl N-phenylcarbamate; imine-based compounds, such as ethyleneimine and propyleneimine; sulfite-based compounds, such as sodium bisulfite and potassium bisulfite; and azole-based compounds. Examples of the azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

Among them, suitable examples of the blocking agent include oxime-based blocking agents, active methylene-based blocking agents, and pyrazole or pyrazole derivatives.

Furthermore, as the blocking agent, it is also possible to use hydroxycarboxylic acids having one or more hydroxyl groups and one or more carboxyl groups, such as hydroxypivalic acid and dimethylolpropionic acid.

In the aqueous coating composition for automotive exterior of the present invention, in a case of using the blocked polyisocyanate, it is possible to suitably use a blocked polyisocyanate compound produced by blocking an isocyanate group using the hydroxycarboxylic acid and then neutralizing a carboxyl group of the hydroxycarboxylic acid to impart water dispersibility.

In a case of using the blocked polyisocyanate compound (B3) as the crosslinking agent (B), an organometallic compound, an acid compound, a basic compound, or the like can be used as a curing catalyst, as necessary.

The blocked polyisocyanate compound (B3) can be used, for example, as a crosslinking agent for a resin containing a hydroxyl group and/or amino group.

In the present invention, a content of the crosslinking agent (B) is preferably in a range from 15 to 55 parts by mass, more preferably in a range from 20 to 50 parts by mass, and particularly preferably in a range from 25 to 45 parts by mass, based on 100 parts by mass of a resin solid content in the aqueous coating composition for automotive exterior, from the viewpoint of weather resistance, hardness, and the like of the coating film to be formed.

Pigment (C)

The aqueous coating composition for automotive exterior of the present invention contains the pigment (C).

It is preferable that the aqueous coating composition for automotive exterior of the present invention can hide a color of a coating film of a lower layer in a case of performing coating with a cured film thickness of 30 μm.

Examples of the pigment (C) include a color pigment (C1), an extender pigment (C2), and a photoluminescent pigment (C3). The pigments (C) can be used alone or in combination of two or more.

Examples of the color pigment (C1) include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, and diketopyrrolopyrrole-based pigments. Among them, titanium oxide and/or carbon black can be suitably used.

In a case where the aqueous coating composition for automotive exterior of the present invention contains the color pigment (C1), a content of the color pigment (C1) is preferably in a range from 1 to 180 parts by mass, more preferably in a range from 5 to 140 parts by mass, and even particularly preferably in a range from 10 to 120 parts by mass, based on 100 parts by mass of the total resin solid content in the aqueous coating composition for automotive exterior.

Examples of the extender pigment (C2) include clay, kaolin, barium sulfate, barium carbonate, calcium carbonate, talc, silica, and alumina white. Among them, barium sulfate and/or talc can be suitably used.

Among them, it is suitable that the aqueous coating composition for automotive exterior of the present invention contains, as the extender pigment (C2), barium sulfate having an average primary particle size of 1 μm or less, more preferably barium sulfate having an average primary particle size in a range from 0.01 to 0.8 μm, because a multilayer coating film having excellent smoothness can be produced.

The average primary particle size of barium sulfate in the present invention is a value determined by observing barium sulfate with a scanning electron microscope and averaging the maximum diameters of 20 barium sulfate particles on a straight line drawn at random on an electron micrograph.

In a case where the aqueous coating composition for automotive exterior of the present invention contains the extender pigment (C2), a content of the extender pigment (C2) is preferably in a range from 1 to 150 parts by mass, more preferably in a range from 5 to 130 parts by mass, and even particularly preferably in a range from 10 to 110 parts by mass, based on 100 parts by mass of the total resin solid content in the aqueous coating composition for automotive exterior.

Examples of the photoluminescent pigment (C3) include aluminum (including vapor-deposited aluminum), copper, zinc, brass, nickel, glass flakes, aluminum oxide, mica, aluminum oxide coated with titanium oxide and/or iron oxide, and mica coated with titanium oxide and/or iron oxide. Among them, an aluminum pigment is preferably used. The aluminum pigment is classified into a non-leafing type aluminum pigment and a leafing type aluminum pigment, and any of them can be used. Among them, a non-leafing type aluminum pigment is preferably used from the viewpoint of adhesiveness of the coating film to be formed.

The photoluminescent pigment (C3) is preferably a scale-shaped pigment. The photoluminescent pigment (C3) preferably has a longitudinal dimension in a range from 1 to 100 μm, particularly from 5 to 40 μm, and a thickness in a range from 0.001 to 5 μm, particularly from 0.01 to 2 μm.

In a case where the aqueous coating composition for automotive exterior of the present invention contains the photoluminescent pigment (C3), a content of the photoluminescent pigment (C3) is preferably in a range from 1 to 100 parts by mass, more preferably in a range from 2 to 60 parts by mass, and even particularly preferably in a range from 3 to 40 parts by mass, based on 100 parts by mass of the total resin solid content in the aqueous coating composition for automotive exterior.

In the present invention, a content of the pigment (C) is preferably in a range from 1 to 180 parts by mass, more preferably in a range from 5 to 170 parts by mass, and even particularly preferably in a range from 10 to 160 parts by mass, based on 100 parts by mass of the resin solid content in the aqueous coating composition for automotive exterior from the viewpoint of stability of the resulting aqueous coating composition for automotive exterior, weather resistance of the coating film to be formed, and the like.

Nanocellulose (D)

The aqueous coating composition for automotive exterior of the present invention contains the nanocellulose (D) in an amount of 0.5 to 2.0 parts by mass in terms of solid content with respect to 100 parts by mass of the resin solid content in the aqueous coating composition for automotive exterior.

The nanocellulose (D) is cellulose produced by disentangling (defibrating) cellulose fibers to a nanosized level.

Examples of the cellulose fibers include natural cellulose fibers, regenerated cellulose fibers, semi-synthetic cellulose fibers, and modified cellulose fibers.

The natural cellulose fibers are produced by removing impurities from a naturally occurring cellulose fiber-containing material through a purification process. Examples of the natural cellulose fiber-containing material include woody materials such as coniferous trees and broadleaf trees, cotton such as cotton linter and cotton lint, pomace such as sugarcane and sugar beet, bast fibers such as flax, ramie, jute, and kenaf, vein fibers such as sisal and pineapple, petiole fibers such as abaca and banana, fruit fibers such as coconut palm, stem fibers such as bamboo, bacterial cellulose produced by bacteria, and sea weeds such as valonia and cladophora.

Examples of the regenerated cellulose fibers include rayon and cupra. Examples of the semi-synthetic cellulose fibers include acetate.

As the modified cellulose fibers, those produced by subjecting cellulose to various types of chemical modification can be used. Examples of the types of the chemical modification include esterification such as carboxymethylation, acylation, and phosphorylation, oxidation such as carboxylation, sulfonation, fluorination, cationization, and treatment with a silane coupling agent.

Further, the nanocellulose (D) may be subjected to the chemical modification after the defibration treatment.

The nanocellulose (D) may be neutralized with a neutralizing agent. As the neutralizing agent, for example, the neutralizing agents described in the description of the resin particles (A) can be used.

The number average fiber diameter of the nanocellulose (D) is preferably in a range from 1 to 500 nm.

The number average length of the nanocellulose (D) is preferably in a range from 10 to 10000 nm.

The number average fiber diameter and the number average length of the nanocellulose (D) can be determined by SEM analysis. For example, fiber diameters and lengths of 50 nanocellulose (D) fibers are measured, and the number average fiber diameter and the number average length can be each calculated as an average value.

A ratio of the number average length to the number average fiber diameter (number average length/number average fiber diameter) of the nanocellulose (D) is preferably in a range from 3 to 10000, and more preferably in a range from 5 to 500, from the viewpoint of sagging resistance, popping resistance, and the like of the resulting coating composition for automotive exterior.

In the present invention, specific examples of the nanocellulose (D) include at least one type selected from the group consisting of cellulose nanofibers (hereinafter sometimes referred to as "CNF") (D1), cellulose nanocrystals (hereinafter sometimes referred to as "CNC") (D2), and composites of cellulose nanofibers (D1) and cellulose nanocrystals (D2).

Among them, the nanocellulose (D) of the present invention is preferably at least one type selected from the group consisting of cellulose nanofibers (D1) and cellulose nanocrystals (D2) from the viewpoint of sagging resistance, popping resistance, and the like of the resulting aqueous coating composition for automotive exterior.

Cellulose Nanofibers (D1)

The cellulose nanofibers (D1) can be produced by a known method. For example, the cellulose nanofibers (D1) can be produced by defibrating a cellulose raw material and pulverizing the cellulose raw material until the fiber diameter becomes a nanosized level. Examples of the defibrating treatment method of the cellulose raw material include a mechanical defibrating treatment and a chemical treatment such as a treatment with an oxidation catalyst solution containing an N-oxyl compound.

The cellulose raw material is not particularly limited as long as it contains cellulose, and examples thereof include various wood pulp, non-wood pulp, bacterial cellulose, regenerated cellulose, waste paper pulp, cotton, valonia cellulose, and hoya cellulose. Various commercially available cellulose powders or microcrystalline cellulose powders may also be used.

As the cellulose nanofibers (D1), those subjected to various types of chemical modification can be used. Examples of the types of the chemical modification include esterification such as carboxymethylation, acylation, and phosphorylation, oxidation such as carboxylation, sulfonation, fluorination, cationization, and treatment with a silane coupling agent.

Further, the cellulose nanofibers (D1) may be neutralized with a neutralizing agent. As the neutralizing agent, for example, the neutralizing agents described in the description of the resin particles (A) can be used.

The cellulose nanofibers (D1) has a number average fiber diameter preferably in a range from 1 to 500 nm, more preferably in a range from 1 to 250 nm, and particularly preferably in a range from 2 to 50 nm, from the viewpoint of sagging resistance, popping resistance, and the like of the resulting aqueous coating composition for automotive exterior.

The cellulose nanofibers (D1) has a number average length preferably in a range from 200 to 10000 nm, more preferably in a range from 200 to 5000 nm, particularly preferably in a range from 300 to 2500 nm, and further particularly preferably in a range from 200 to 1000 nm, from the viewpoint of sagging resistance, popping resistance, and the like of the resulting aqueous coating composition for automotive exterior.

In the present specification, the cellulose nanofibers (D1) have a ratio of the number average length to the number average fiber diameter (number average length/number average fiber diameter) of 50 or more.

The ratio of the number average length to the number average fiber diameter (number average length/number average fiber diameter) of the cellulose nanofibers (D1) is preferably in a range from 50 to 500, more preferably in a range from 50 to 200, and particularly preferably in a range from 50 to 150, from the viewpoint of sagging resistance, popping resistance, and the like of the resulting coating composition for automotive exterior.

Examples of commercially available products of the cellulose nanofibers (D1) include "Nanocellulose Fiber" (available from Chuetsu Pulp & Paper Co., Ltd.), "BiNFi-s" (available from Sugino Machine Limited), "RHEOCRYSTA" (available from DKS Co., Ltd.), "Cellulose Nanofiber" (available from Mori Machinery Corporation), "Cellenpia" (available from Nippon Paper Industries Co., Ltd.), and "AUROVISCO" (available from Oji Holding Corporation).

Cellulose Nanocrystals (D2) The cellulose nanocrystals (D2) can be obtained by a known method. For example, the cellulose nanocrystals (D2) can be produced by treating a cellulose raw material with an acid such as sulfuric acid to hydrolyze and remove non-crystalline portions, followed by a mechanical defibrating treatment.

The cellulose raw material is not particularly limited as long as it contains cellulose, and the same cellulose raw material as the raw material of the cellulose nanofibers (D1) described above can be used. The mechanical defibrating treatment is also not particularly limited, and a method known in the related art can be used, for example, a method using an apparatus such as a high-pressure homogenizer, an ultrahigh-pressure homogenizer, a ball mill, a roll mill, a cutter mill, a planetary mill, a jet mill, an attritor, a grinder, a juicer mixer, a homomixer, an ultrasonic homogenizer, a nanogenizer, underwater counter collision, or a single-screw or double-screw extruder.

As the cellulose nanocrystals (D2), those subjected to various types of chemical modification can be used. Examples of the types of the chemical modification include esterification such as carboxymethylation, acylation, and phosphorylation, oxidation such as carboxylation, sulfonation, fluorination, cationization, and treatment with a silane coupling agent.

The cellulose nanocrystals (D2) may be neutralized with a neutralizing agent. As the neutralizing agent, for example, the neutralizing agents described in the description of the resin particles (A) can be used.

The cellulose nanocrystals (D2) has a number average fiber diameter preferably in a range from 1 to 50 nm, more preferably in a range from 1 to 30 nm, particularly preferably in a range from 1 to 15 nm, and further particularly preferably in a range from 1 to 5 nm, from the viewpoint of sagging resistance, popping resistance, and the like of the resulting aqueous coating composition for automotive exterior.

The cellulose nanocrystals (D2) has a number average length preferably in a range from 10 to 500 nm, more preferably in a range from 10 to 300 nm, particularly preferably in a range from 20 to 250 nm, and further particularly preferably in a range from 30 to 150 nm, from the viewpoint of sagging resistance, popping resistance, and the like of the resulting aqueous coating composition for automotive exterior.

In the present specification, the cellulose nanocrystals (D2) have a ratio of the number average length to the number average fiber diameter (number average length/number average fiber diameter) of less than 50.

The ratio of the number average length to the number average fiber diameter (number average length/number average fiber diameter) of the cellulose nanocrystals (D2) is preferably 3 or more and less than 50, more preferably 5 or more and less than 50, and even particularly preferably 10 or more and less than 50, from the viewpoint of sagging resistance, popping resistance, and the like of the resulting coating composition for automotive exterior.

In addition, examples of commercially available products of the cellulose nanocrystals (D2) include "Celluforce NCC" available from Celluforce Inc.

In the present invention, a content of the nanocellulose (D) is in a range from 0.5 to 2.0 parts by mass with respect to 100 parts by mass of the resin solid content in the aqueous coating composition for automotive exterior. Above all, the content of the nanocellulose (D) is preferably in a range from 0.6 to 1.8 parts by mass, and more preferably in a range from 0.7 to 1.7 parts by mass, with respect to 100 parts by mass of the resin solid content in the aqueous coating composition for automotive exterior, from the viewpoint of the high solid content, popping resistance, sagging resistance, and the like of the resulting aqueous coating composition for automotive exterior.

Additional Component
Organic Solvent (E) Having Solubility in Water of 4 Mass % or Less>

The aqueous coating composition for automotive exterior of the present invention preferably contains no organic solvent (E) having a solubility in water of 4 mass % or less at 20° C., or the content of the organic solvent (E) having a solubility in water of 4 mass % or less at 20° C. is preferably 19 parts by mass or less with respect to 100 parts by mass of the resin solid content in the coating, from the viewpoint of reduction of the organic solvent content, and popping resistance, sagging resistance, and the like of the resulting aqueous coating composition for automotive exterior.

Above all, the content of the organic solvent (E) having a solubility in water of 4 mass % or less at 20° C. is preferably in a range from 1 to 19 parts by mass, more preferably in a range from 3 to 17 parts by mass, particularly preferably in a range from 8 to 16 parts by mass, and further particularly preferably in a range from 10 to 15 parts by mass with respect to 100 parts by mass of the resin solid content of the aqueous coating composition for automotive exterior, from the viewpoint of reduction of the organic solvent content, and popping resistance, sagging resistance, and the like of the resulting aqueous coating composition for automotive exterior.

The organic solvent (E) having a solubility in water at 20° C. of 4 mass % or less is an organic solvent in which a content ratio of the organic solvent is 4 mass % or less with respect to the total mass of water and the organic solvent when the organic solvent is dissolved in water to the utmost limit at 20° C.

Examples of the organic solvent (E) having a solubility in water at 20° C. of 4 mass % or less include hydrocarbon-based solvents such as mineral spirit, toluene, xylene, and solvent naphtha; alcohol-based solvents such as 1-hexanol, 1-octanol, 2-octanol, 2-ethyl-1-hexanol, 1-decanol, benzyl alcohol, ethylene glycol monohexyl ether, and ethylene glycol mono-2-ethylhexyl ether; ester-based solvents such as n-butyl acetate, isobutyl acetate, methylamyl acetate, ethylene glycol monobutyl ether acetate, and n-butyl propionate; ether-based solvents such as diethylene glycol dibutyl ether; and ketone-based solvents such as methyl isobutyl ketone, 2-heptanone, ethyl n-amyl ketone, diisobutyl ketone, isophorone, and cyclohexanone. These resins can each be used alone, or two or more types of these resins can be combined and used.

As the organic solvent (E) having a solubility in water at 20° C. of 4 mass % or less, an alcohol-based solvent is preferably used from the viewpoint of improvement in popping resistance, and smoothness and the like of the coating film to be formed. Above all, an alcohol-based solvent having 7 to 14 carbon atoms is preferable, at least one type of alcohol-based solvent selected from the group consisting of 1-octanol, 2-octanol, 2-ethyl-1-hexanol and ethylene glycol mono-2-ethylhexyl ether is more preferable, and 2-ethyl-1-hexanol is particularly preferable.

The aqueous coating composition for automotive exterior of the present invention may further contains, as necessary, a resin other than the resin particles (A), an organic solvent other than the organic solvent (E) having a solubility in water at 20° C. of 4 mass % or less, a thickener, a curing catalyst other than the curing catalyst of the crosslinking agent (B), an ultraviolet absorber, a light stabilizer, an antifoaming agent, a plasticizer, a surface conditioner, an antisettling agent, and the like singly or in combination of two or more thereof.

As the resin other than the resin particles (A), a water-soluble resin can be used. In the present specification, the water-soluble resin means a resin which is dissolved in water or an aqueous medium which is a mixed medium of water and an organic medium, and can be present in water or an aqueous medium in a state in which the resin does not have a particle size when measured with a submicron particle size distribution measurement device by the laser diffraction/scattering method.

Examples of the water-soluble resin include resins such as a water-soluble acrylic resin, a water-soluble urethane resin, a water-soluble acrylic-urethane composite resin, a water-soluble polyester resin, a water-soluble acrylic-polyester composite resin, a water-soluble alkyd resin, and a water-soluble epoxy resin.

The water-soluble acrylic resin is different from the acrylic resin particles (A2) which are synthesized in a particulate form in a dispersion medium such as water, and is an acrylic resin which can be dissolved in water by a water-dispersible group such as a hydrophilic group. Thus, the water-soluble acrylic resin usually has a water-dispersible group such as an acid group.

The water-soluble acrylic resin can be synthesized by copolymerizing a water-dispersible group-containing polymerizable unsaturated monomer and additional polymerizable unsaturated monomer copolymerizable with the water-dispersible group-containing polymerizable unsaturated monomer by a common method, for example, by a method of solution polymerization in an organic medium.

As the polymerizable unsaturated monomer, for example, the polymerizable unsaturated monomers described in the description of the acrylic resin particles (A2) can be used. These polymerizable unsaturated monomers can be each used alone or in combination in two or more.

The synthesis of the water-soluble acrylic resin is not particularly limited. For example, the synthesis can be performed by adding dropwise a monomer mixture in the presence of an organic solvent while heating and polymerizing the monomer mixture.

A reaction temperature during polymerization is usually in a range from about 60 to about 200° C., preferably about 70 to about 160° C., and a reaction time is usually about 10 hours or shorter, preferably about 0.5 to about 6 hours.

In the above reaction, examples of the polymerization initiator include the polymerization initiators exemplified in the description of the acrylic resin particles (A2). These polymerization initiators can be used alone or in combination of two or more.

From the viewpoint of polymerization reactivity and the like, an amount of the polymerization initiator to be used is usually in a range from 0.01 to 20 mass %, particularly 0.1 to 15 mass %, and more particularly 0.3 to 10 mass %, based on the total amount of the polymerizable unsaturated monomer.

The synthesis of the water-soluble acrylic resin is preferably performed in the presence of an organic solvent from the viewpoint of production. The organic solvent can be appropriately selected in consideration of the polymerization temperature, solubility and dispersibility of the acrylic resin in water, and the like.

The organic solvent is preferably an alcohol-based solvent, a cellosolve-based solvent, a carbitol-based solvent, or the like. Specific examples thereof include alcohol-based solvents such as n-butanol; cellosolve-based solvents such as ethylene glycol monobutyl ether, ethylene glycol monoisopropyl ether, ethylene glycol monomethyl ether, propylene glycol monomethyl ether, propylene glycol monopropyl ether, propylene glycol mono-n-butyl ether, dipropylene glycol monomethyl ether, and dipropylene glycol mono-n-butyl ether; and carbitol-based solvents such as diethylene glycol monobutyl ether, diethylene glycol monoethyl ether, and diethylene glycol monoethyl ether acetate.

Furthermore, as the organic solvent, an organic solvent other than the above-described organic solvents, which is not mixed with water, can be also used as long as the solubility of the water-soluble acrylic resin in water is not hindered. Examples of such an organic solvent include: aromatic hydrocarbon-based solvents such as toluene and xylene; ester-based solvents such as ethyl acetate and butyl acetate; and ketone-based solvents such as methylethylketone and cyclohexanone.

Examples of the organic solvent other than the organic solvent (E) having a solubility in water at 20° C. of 4 mass % or less include ester-based solvents such as ethyl acetate, ethylene glycol monomethyl ether acetate, diethylene glycol monobutyl ether acetate, and 3-methoxybutyl acetate; ketone-based solvents such as acetone, methyl ethyl ketone, and cyclohexanone; alcohol-based solvents such as methanol, ethanol, isopropanol, n-butanol, see-butanol, isobutanol, ethylene glycol monomethyl ether, ethylene glycol monoethyl ether, ethylene glycol monobutyl ether, ethylene glycol isopropyl ether, propylene glycol monomethyl ether, propylene glycol monobutyl ether, diethylene glycol monoethyl ether, diethylene glycol monobutyl ether, 3-methoxy-3-methyl-1-butanol, dipropylene glycol monomethyl ether, propylene glycol mono-n-butyl ether, and dipropylene glycol n-butyl ether; and ether-based solvents such as dioxane. These can be used alone or in combination of two or more.

A content of the organic solvent other than the organic solvent (E) is preferably in a range from 0 to 100 parts by mass, more preferably in a range from 0 to 50 parts by mass, and particularly preferably in a range from 0 to 20 parts by mass, based on 100 parts by mass of the resin solid content in the aqueous coating composition for automotive exterior of the present invention.

A total content of the organic solvents in the aqueous coating composition for automotive exterior of the present invention is preferably in a range from 0 to 100 parts by mass, more preferably in a range from 1 to 50 parts by mass, particularly preferably in a range from 5 to 40 parts by mass, and even particularly preferable in a range from 8 to 35 parts by mass, based on 100 parts by mass of the resin solid content in the aqueous coating composition for automotive exterior.

The medium of the aqueous coating composition for automotive exterior of the present invention is an aqueous medium. The aqueous medium is not particularly limited as long as it mainly contains water. Examples of the aqueous medium include water and a water-organic solvent mixed solution containing water and an organic solvent. Among them, a content of the organic solvent in the water-organic solvent mixed solution is preferably in a range from 0.8 to 45 mass %, more preferably in a range in a range from 0.9 to 30 mass %, and particularly preferably in a range from 1.0 to 15 mass % of the water-organic solvent mixed solution.

Examples of the thickeners include inorganic thickeners such as silicates, metal silicates, montmorillonite, and colloidal alumina; polyacrylic acid-based thickeners such as copolymers of (meth)acrylic acid and (meth)acrylic ester and sodium polyacrylate; an associative thickener having a hydrophilic portion and a hydrophobic portion in one molecule, in which in an aqueous medium, the hydrophobic portion is absorbed on a surface of a pigment or emulsion particle in a coating composition or the hydrophobic portions are associated to effectively exhibit a thickening action; protein-based thickeners such as casein, sodium caseinate, and ammonium caseinate; alginic acid-based thickeners such as sodium alginate; polyvinyl-based thickeners such as polyvinyl alcohol, polyvinyl pyrrolidone, and polyvinyl benzyl ether copolymers; polyether-based thickeners such as Pluronic (trade name) polyethers, polyetherdialkyl esters, polyetherdialkyl ethers, and polyether-epoxy-modified products; maleic anhydride copolymer-based thickeners such as partial esters of vinyl methyl ether-maleic anhydride copolymers; and polyamide-based thickeners such as polyamide amine salts.

These thickeners can be used alone, or in combination of two or more.

Examples of the curing catalyst other than the crosslinking agent (B) include an organometallic compound, an acid compound, and a base compound.

Examples of the organometallic compound include metal catalysts such as tetraisopropyl titanate, tetrabutyl titanate, lithium acetate, iron (III) acetylacetonate, zinc 2-ethylhexanoate, copper acetate, vanadium trichloride, tin octylate, dibutyltin diacetate, dibutyltin dioctoate, dibutyltin dilaurate, dibutyltin dimaleate, tetrabutyltin, dibutyltin oxide, tetra-n-butyl-1,3-diacetyloxydistannoxane, tetra-n-propyl-1,3-diacetyloxydistannoxane, and tetra-n-butyl-1,3-dilauryloxydistannoxane, and particularly preferred are organotin-based compounds such as tin octylate, dibutyltin diacetate, dibutyltin dilaurate, and distannoxanes.

As the acid compound, for example, a sulfonic acid such as paratoluenesulfonic acid, dinonylnaphthalenesulfonic acid, or dinonylnaphthalenedisulfonic acid; an ester of an alkylphosphoric acid such as monobutylphosphoric acid, dibutylphosphoric acid, octylphosphoric acid, or di(2-ethylhexyl)phosphoric acid; a salt of such an acid with an amine; or the like can be used as a catalyst.

Examples of the base compound include trimethylamine, triethylamine, dimethylcyclohexylamine, N-tetramethylhexane-1,6-diamine, N-pentamethyldiethylenetriamine, and 2-methyl-1,4-diazabicyclo[2,2,2]octane.

Examples of the ultraviolet absorber include a benzotriazole-based absorber, a triazine-based absorber, a salicylic acid derivative-based absorber, and a benzophenone-based absorber.

Examples of the light stabilizer include a hindered amine-based light stabilizer.

Aqueous Coating Composition for Automotive Exterior

The aqueous coating composition for automotive exterior of the present invention can be prepared by mixing the resin particles (A), the crosslinking agent (B), the pigment (C), the nanocellulose (D) and, as necessary, additional components in a medium by an ordinary coating-making means. For the medium, an aqueous medium, for example, an organic solvent, water, a mixed medium of water and an organic solvent, or the like can be used.

The aqueous coating composition for automotive exterior of the present invention has a solid content concentration of the coating composition in a range from 45 to 65 mass %, and a viscosity of the coating composition measured by a Brookfield-type viscometer under measurement conditions of a temperature of 20° C. and a rotor rotation speed of 60 rpm in a range from 350 to 1200 mPa·s. As the Brookfield-type viscometer, "LVDV-I" (trade name, available from BROOKFIELD, Brookfield B type viscometer) can be used.

Above all, the solid content concentration of the aqueous coating composition for automotive exterior of the present invention is preferably 46 mass % or more, and more preferably 47 mass % or more, from the viewpoint of increasing the solid content of the resulting aqueous coating composition for automotive exterior. In addition, from the viewpoint of stability of the aqueous coating composition for automotive exterior, the solid content concentration is preferably 64 mass % or less, more preferably 63 mass % or less.

The solid content concentration of the coating composition can be adjusted, for example, by regulating the amount of the medium.

The viscosity of the aqueous coating composition for automotive exterior of the present invention measured by the Brookfield-type viscometer under measurement conditions of a temperature of 20° C. and a rotor rotation speed of 60 rpm is preferably in a range from 500 to 1200 mPa·s, more preferably in a range from 600 to 1100 mPa·s, and particularly preferably in a range from 650 to 1000 mPa s, from the viewpoint of sagging resistance, popping resistance, and the like of the resulting aqueous coating composition for automotive exterior.

A Ti value (thixotropic index) of the aqueous coating composition for automotive exterior of the present invention measured by the Brookfield-type viscometer under measurement conditions of a temperature of 20° C. and a rotor rotation speed of 60 rpm is preferably in a range from 2.3 to 6.0, more preferably in a range from 2.5 to 5.5, and particularly preferably in a range from 3.0 to 5.0, from the viewpoint of sagging resistance, popping resistance, and the like of the resulting aqueous coating composition for automotive exterior.

In the present specification, the Ti value (thixotropic index) is a value calculated by dividing the viscosity (mPa s) of the coating composition under measurement conditions of a temperature of 20° C. and a rotor rotation speed of 6 rpm by the viscosity (mPa s) of the coating composition under measurement conditions of a temperature of 20° C. and a rotor rotation speed of 60 rpm, by the Brookfield-type viscometer, in other words, Ti value=(coating viscosity at 6 rpm)/(coating viscosity at 60 rpm).

Coated Article

An object to be coated is coated with the aqueous coating composition for automotive exterior of the present invention to form an uncured coating film, and then the uncured coating film is cured, whereby a cured coating film of the aqueous coating composition for automotive exterior of the present invention can be formed on the object to be coated. Thus, an article having a coating film formed by curing the aqueous coating composition for automotive exterior of the present invention can be produced.

Coating of the aqueous coating composition for automotive exterior of the present invention can be performed by a method known in the related art, for example, air spray coating, airless spray coating, rotary atomization coating, inkjet coating or the like. Among them, air spray coating, airless spray coating, and rotary atomization coating are preferable as the applying method, and rotary atomization coating is preferable from the viewpoint of coating efficiency and smoothness of the coating film to be formed.

In addition, from the viewpoint of improving the coating efficiency, it is preferable to apply static electricity at the time of coating.

Such a coating method can be carried out once or several times until a desired film thickness is achieved. The film thickness is preferably in a range from 3 to 100 μm, particularly preferably in a range from 5 to 60 μm based on the cured coating film, and the coating film can be cured, for example, by heating at room temperature to 170° C., as necessary. The room temperature may range from about 15° C. to 25° C. Heat-curing can be carried out using a heating means known per se, for example, a drying furnace such as a hot air furnace, an electric furnace, or an electromagnetic induction heating furnace. As necessary, preheating may be performed at a temperature of about 50 to 110° C. for about 1 to 30 minutes to promote volatilization of volatile components such as a medium before performing heat-curing.

Preferred examples of the object to be coated (base material) include, but are not limited to, metal materials such as steel sheets such as cold-rolled steel sheets, galvanized steel sheets, zinc-alloy-plated steel sheets, stainless-steel sheets, and tin-plated steel sheets, aluminum sheets, and aluminum-alloy sheets; resins such as polyethylene resins, polypropylene resins, acrylonitrile-butadiene-styrene (ABS) resins, polyamide resins, acrylic resins, vinylidene chloride resin, polycarbonate resins, polyurethane resins, and epoxy resins; and resinous materials such as various types of FRP.

In addition, the object to be coated may be subjected to surface treatment, such as phosphate treatment, chromate treatment, or composite oxide treatment, on the metal surface of the metal base materials or vehicle bodies.

Further, the object to be coated may be one in which an undercoat film of various electrodeposition coatings or the like is formed on the metal base material, vehicle body, or the like, or one in which an intermediate coat film is formed on the undercoat film. In addition, the object to be coated may be one in which a primer coating film is formed on a plastic base material such as a bumper. The intermediate coat film and the primer coating film may be uncured.

The object to be coated is preferably a metal base material which may be surface-treated and on which an undercoat film is formed by an electrodeposition coating, and more preferably a metal base material in which an undercoat film formed by the electrodeposition coating is heat-cured.

When used, the aqueous coating composition for automotive exterior of the present invention can be applied by being diluted with water and/or an organic solvent, as necessary, to have an appropriate viscosity adjusted.

Method for Forming Multilayer Coating Film

The aqueous coating composition for automotive exterior of the present invention can be suitably used particularly as an aqueous coating composition for automotive exterior which forms a first colored coating film in a method for forming a three-layer multilayer coating film, the method including the following four processes.

The method for forming a multilayer coating film, including
(1) forming a first colored coating film by applying the aqueous coating composition for automotive exterior of the present invention to an object to be coated;
(2) applying, on the first colored coating film that is uncured, an aqueous second colored coating composition to form a second colored coating film;
(3) applying, on the second colored coating film that is uncured, a clearcoat coating composition to form a clearcoat coating film; and
(4) simultaneously heat-curing the first colored coating film that is uncured, the second colored coating film that is uncured, and the clearcoat coating film that is uncured.

Process (1)

The aqueous coating composition for automotive exterior of the present invention can be applied onto the object to be coated by a method known per se, for example, an air spray, an airless spray, a rotary atomization coater, or an inkjet-type coater. In the present method for forming a multilayer coating film, the object to be coated is preferably a metal base material which may be surface-treated and on which an undercoat film is formed by an electrodeposition coating, and more preferably a metal base material in which an undercoat film formed by the electrodeposition coating is heat-cured.

The coating method is preferably air spraying, airless spraying, and rotary atomization coating. In addition, static electricity may be applied during coating. A coating film thickness is usually 5 to 70 μm, preferably 10 to 50 μm, more preferably 10 to 40 μm as a cured film thickness.

Process (2)

The aqueous second colored coating composition is further applied onto the first colored coating film formed as described above.

A solid content of the first colored coating film when the aqueous second colored coating composition is applied is preferably in a range from 70 to 100 mass %, more preferably in a range from 80 to 100 mass %, and even particularly preferably in a range from 85 to 100 mass %, from the viewpoint of popping resistance, sagging resistance, smoothness of the coating film to be formed, and the like.

The solid content of the first colored coating film can be adjusted by, for example, preliminary heating (preheating), air blowing, or the like before applying the aqueous second colored coating composition.

The preliminary heating can ordinarily be performed by directly or indirectly heating the coated object in a drying furnace at a temperature from 50 to 110° C., and preferably from 60 to 90° C. for about 1 to 30 minutes.

In addition, the air blowing can ordinarily be performed by blowing air of normal temperature or heated to a temperature of 25° C. to 90° C. on the coated surface of the coated object.

The solid content of the first colored coating film can be measured, for example, by the following method.

First, the aqueous coating composition for automotive exterior of the present invention is applied onto an aluminum foil whose mass ($W_1$) has been measured in advance at the same time as the object to be coated. Subsequently, the aluminum foil, which has been preheated as necessary after the application, is recovered immediately before the aqueous second colored coating composition is applied, and the mass thereof ($W_2$) is measured. Next, the recovered aluminum foil is dried at 110° C. for 1 hour and allowed to cool to room temperature in a desiccator. Then, the mass ($W_3$) of the aluminum foil is measured, and the solid content is determined according to the following equation.

$$\text{Solid Content (mass \%)} = \{(W_3 - W_1)/(W_2 - W_1)\} \times 100$$

As the aqueous second colored coating composition, for example, those known per se which are usually used in the coating of automotive bodies can be used. Specifically, it is possible to use a coating composition prepared by dissolving or dispersing, in water, coating film forming components including a base resin having a crosslinkable functional group such as a carboxyl group or a hydroxyl group, such as an acrylic resin, a polyester resin, an alkyd resin, a urethane resin, or an epoxy resin, and a crosslinking agent such as a polyisocyanate compound that may be blocked, a melamine resin, or a urea resin, together with a pigment, and another additive.

As the base resin in the aqueous second colored coating composition, for example, the resin particles described in the description of the resin particles (A), the water-soluble resins described in the description of the additional components, and the like can be used. As the crosslinking agent in the aqueous second colored coating composition, for example, the crosslinking agents described in the description of the crosslinking agent (B) can be used.

Among them, a thermosetting aqueous coating containing a hydroxyl group-containing acrylic resin and/or a hydroxyl group-containing polyester resin as at least one type of the base resin and a melamine resin and/or an optionally blocked polyisocyanate compound as at least one type of the crosslinking agent can be suitably used.

As the pigment component, the color pigments, the photoluminescent pigments, the extender pigments, and the like exemplified in the description of the pigment (C) can be used, and when a photoluminescent pigment is used as at least one type of the pigment component, a coating film having a metallic tone or a pearl tone can be formed.

Examples of the photoluminescent pigments include aluminum (including vapor-deposited aluminum), copper, zinc, brass, nickel, aluminum oxide, mica, aluminum oxide coated with titanium oxide and/or iron oxide, mica coated with titanium oxide and/or iron oxide, glass flakes, and hologram pigments. Among them, aluminum, aluminum oxide, mica, aluminum oxide coated with titanium oxide and/or iron oxide, and mica coated with titanium oxide and/or iron oxide are preferably used, and aluminum is particularly preferably used. The photoluminescent pigments can be used alone or in combination of two or more.

Furthermore, the photoluminescent pigment is preferably a scale-shaped pigment. The photoluminescent pigment has an average longitudinal dimension preferably in a range from 1 to 100 μm, more preferably 5 to 40 μm, and an average thickness preferably in a range from 0.0001 to 5 μm, more preferably 0.001 to 2 μm.

In a case where the aqueous second colored coating composition contains the photoluminescent pigment, a content of the photoluminescent pigment is preferably in a range from 1 to 50 parts by mass, more preferably in a range from 2 to 30 parts by mass, and even particularly preferably in a range from 3 to 20 parts by mass, based on 100 parts by mass of the resin solid content in the aqueous second colored coating composition.

The aqueous second colored coating composition can be applied by a method known per se, such as an air spray, an airless spray, a rotary atomization coater, or an inkjet-type coater. Electrostatic application may also be performed during the application. A coating film thickness is usually in a range from 5 to 40 μm, and preferably in a range from 10 to 30 μm as a cured film thickness.

The aqueous second colored coating composition may further contain, as necessary, common coating additives such as a curing catalyst, a thickener, an ultraviolet absorber, a light stabilizer, an antifoaming agent, a plasticizer, an organic solvent, a surface conditioner, and an antisettling agent, singly or in combination of two or more kinds.

The second colored coating film produced by applying the aqueous second colored coating composition can be dried, for example, by heating at a temperature in a range from 50 to 110° C., preferably in a range from 60 to 90° C., for about 1 to 60 minutes by preheating, air blowing, or the like.

Process (3)

On the second colored coating film formed as described above, a clearcoat coating composition is further applied.

As the clearcoat coating composition, for example, it is possible to use known thermosetting clear coating compositions that are typically used for coating of automotive bodies. Examples of the thermosetting clear coating composition include: organic solvent-type thermosetting coating compositions containing a base resin having a crosslinkable functional group and a crosslinking agent; aqueous thermosetting coating compositions containing a base resin having a crosslinkable functional group and a crosslinking agent; and powder thermosetting coating compositions containing a base resin having a crosslinkable functional group and a crosslinking agent. Among them, the thermosetting clear coating composition is preferably an organic solvent-based thermosetting coating composition containing a base resin having a crosslinkable functional group and a crosslinking agent from the viewpoint of sagging resistance, popping resistance, finished appearance, and the like of the multilayer coating film to be formed.

Examples of the cross-linking functional group contained in the base resin include a carboxyl group, a hydroxyl group, an epoxy group, and a silanol group. Examples of the type of base resin include acrylic resins, polyester resins, alkyd resins, urethane resins, epoxy resins, and fluororesins. Examples of the crosslinking agent include polyisocyanate compounds, blocked polyisocyanate compounds, melamine resins, urea resins, carboxyl group-containing compounds, carboxyl group-containing resins, epoxy group-containing resins, and epoxy group-containing compounds.

The combination of the base resin/crosslinking agent of the clearcoat coating composition is preferably a carboxyl group-containing resin/epoxy group-containing resin, a hydroxyl group-containing resin/polyisocyanate compound, a hydroxyl group-containing resin/blocked polyisocyanate compound, a hydroxyl group-containing resin/melamine resin, or the like.

In addition, the clearcoat coating composition may be a one-component coating or a multi-component coating, such as a two-component urethane resin coating.

Furthermore, the clearcoat coating composition may include, as necessary and in a range in which transparency is not interfered with, a color pigment, a photoluminescent pigment, a dye, or the like, and may further include, as appropriate, an extender pigment, an ultraviolet absorber, a light stabilizer, an antifoaming agent, a thickener, a rust inhibitor, a surface conditioner, and the like.

The clearcoat coating composition can be applied onto the second colored coating film by a method known per se, such as by an airless spray, an air spray, a rotary atomization coater, an inkjet-type coater, or like. Electrostatic application may also be performed during the application. The coating film thickness can usually be, as a cured film thickness, in a range from 10 to 80 μm, preferably in a range from 20 to 50 μm.

Process (4)

The multilayer coating film including the three layers of the first colored coating film, the second colored coating film, and the clearcoat coating film formed as described above can be simultaneously cured by heating at a temperature in a range from 60 to 180° C., preferably in a range from 70 to 160° C. for about 15 to 60 minutes by a typical coating film baking means such as hot air heating, infrared heating, or high-frequency heating.

The present invention can employ the following configurations.

Aspect 1. An aqueous coating composition for automotive exterior containing:
resin particles (A);
a crosslinking agent (B);
a pigment (C); and
a nanocellulose (D);
wherein
a content of the nanocellulose (D) is 0.5 to 2.0 parts by mass in terms of solid content with respect to 100 parts by mass of a resin solid content in the coating,
a solid content concentration of the coating composition is in a range from 45 to 65 mass %, and
a viscosity of the coating composition measured by a Brookfield-type viscometer under measurement conditions of a temperature of 20° C. and a rotor rotation speed of 60 rpm is in a range from 350 to 1200 mPa·s.

Aspect 2. The aqueous coating composition for automotive exterior according to Aspect 1, wherein the resin particles (A) have an average particle size in a range from 300 to 800 nm.

Aspect 3. The aqueous coating composition for automotive exterior according to Aspect 1 or 2, wherein the nanocellulose (D) is at least one type selected from the group consisting of cellulose nanofibers (D1) and cellulose nanocrystals (D2).

Aspect 4. The aqueous coating composition for automotive exterior according to any one of Aspects 1 to 3, wherein the aqueous coating composition contains no organic solvent (E) having a solubility in water at 20° C. of 4 mass % or less, or a content of the organic solvent (E) having a solubility in water at 20° C. of 4 mass % or less is 19 parts by mass or less with respect to 100 parts by mass of the resin solid content in the coating.

Aspect 5. The aqueous coating composition for automotive exterior according to Aspect 4, wherein the content of the organic solvent (E) having a solubility in water at 20° C. of 4 mass % or less is in a range from 1 to 19 parts by mass with respect to 100 parts by mass of the resin solid content in the coating.

Aspect 6. The aqueous coating composition for automotive exterior according to any one of Aspects 1 to 5, wherein the resin particles (A) contain at least one type of resin particles selected from the group consisting of urethane resin particles (A1), acrylic resin particles (A2), acrylic-urethane composite resin particles (A3), polyester resin particles, and acrylic-polyester composite resin particles (A5).

Aspect 7. The aqueous coating composition for automotive exterior according to any one of Aspects 1 to 5, wherein the resin particles (A) contain at least one type of resin particles selected from the group consisting of urethane resin particles (A1) and acrylic resin particles (A2).

Aspect 8. The aqueous coating composition for automotive exterior according to any one of Aspects 1 to 7, wherein a content of the resin particles (A) is in a range from 30 to 85 parts by mass based on 100 parts by mass of the resin solid content in the aqueous coating composition for automotive exterior.

Aspect 9. The aqueous coating composition for automotive exterior according to any one of Aspects 1 to 8, wherein the crosslinking agent (B) contains at least one type selected from the group consisting of an amino resin (B1), a polyisocyanate compound (B2), and a blocked polyisocyanate compound (B3).

Aspect 10. The aqueous coating composition for automotive exterior according to any one of items 1 to 9, wherein a content of the crosslinking agent (B) is in a range from 15 to 55 parts by mass based on 100 parts by mass of the resin solid content in the aqueous coating composition for automotive exterior.

Aspect 11. The aqueous coating composition for automotive exterior according to any one of Aspects 1 to 10, wherein the pigment (C) contains a color pigment (C1).

Aspect 12. The aqueous coating composition for automotive exterior according to any one of Aspects 1 to 11, wherein a content of the pigment (C) is in a range from 1 to 180 parts by mass based on 100 parts by mass of the resin solid content in the aqueous coating composition for automotive exterior.

Aspect 13. The aqueous coating composition for automotive exterior according to any one of Aspects 1 to 12, wherein the organic solvent (E) having a solubility in water at 20° C. of 4 mass % or less is an alcohol having 7 to 14 carbon atoms.

Aspect 14. An automobile coated with the aqueous coating composition for automotive exterior described in any one of Aspects 1 to 13.

Aspect 15. A method for forming a coating film, including applying the aqueous coating composition for automotive exterior described in any one of Aspects 1 to 13 onto an object to be coated.

Aspect 16. A method for forming a multilayer coating film, the method including:
(1) applying the aqueous coating composition for automotive exterior described in any one of Aspects 1 to 13 onto an object to be coated to form a first colored coating film;
(2) applying, on the first colored coating film that is uncured, an aqueous second colored coating composition to form a second colored coating film;
(3) applying, on the second colored coating film that is uncured, a clearcoat coating composition to form a clearcoat coating film; and
(4) simultaneously heat-curing the first colored coating film that is uncured, the second colored coating film that is uncured, and the clearcoat coating film that is uncured.

EXAMPLES

The present invention will be described more specifically below through Examples and Comparative Examples. However, the present invention is not limited to these examples only. Both "parts" and "%" are based on mass. The film thickness of the coating film is based on a cured coating film.
Production of Resin Particles (A)
Acrylic-Polyester Composite Resin Particles (A5)

Production Example 1

To a reactor equipped with a thermometer, a thermostat, a stirrer, a heater, and a rectifier, 19.0 parts of isophthalic acid, 32.4 parts of adipic acid, 0.7 parts of maleic anhydride, and 45.1 parts of 1,6-hexanediol were charged, and the temperature was raised to 160° C. while stirring. Then, the temperature of the contents was gradually raised from 160° C. to 230° C. over 3.5 hours, and the produced condensed water was distilled off through the rectifier. After the reaction was continued at 230° C. for 90 minutes, the rectifier was replaced with a water separator, about 4 parts of toluene was added to the contents, and water and toluene were azeotropically distilled to remove condensed water. Measurement of the acid value was started one hour after the addition of toluene, and when it was confirmed that the acid value reached less than 6, heating was stopped, toluene was removed under reduced pressure, then 20 parts of dipropylene glycol monomethyl ether was added for dilution, and 2.1 parts of methoxypolyethylene glycol methacrylate (Mw 1000) was added.

Then, the mixture was cooled to 130° C., and a mixture of 3 parts of styrene, 3.3 parts of acrylic acid, 6.6 parts of n-butyl acrylate, and 0.75 parts of t-butylperoxy-2-ethylhexanoate was added dropwise over 30 minutes. Thereafter, the mixture was aged at 130° C. for 30 minutes, 0.05 parts of t-butylperoxy-2-ethylhexanoate was added as an additional catalyst, and the mixture was further aged for 1 hour.

Subsequently, the mixture was cooled to 85° C., neutralized with dimethylethanolamine, and dispersed with deionized water to produce an aqueous dispersion of acrylic-polyester composite resin particles (A5-1) having a solid content of 40%. The resulting acrylic-polyester composite resin particles (A5-1) had an acid value of 30 mg KOH/g, a hydroxyl value of 47 mg KOH/g, an average particle size of 100 nm (measured at 20° C. by diluting with deionized water and using a submicron particle size distribution measurement device "Microtrac MT3000" (trade name, available from Microtrac Retsch GmbH)), and a number average molecular weight of 3000 (number average molecular weight of the polyester portion of 1850).
Polyester Resin Particles (A4)

Production Example 2

A reaction vessel equipped with a thermometer, a thermostat, a stirrer, a reflux condenser, and a water separator was charged with 174 parts of trimethylolpropane, 327 parts of neopentyl glycol, 352 parts of adipic acid, 109 parts of isophthalic acid, and 101 parts of 1,2-cyclohexane dicarboxylic anhydride, and the temperature was raised from 160° C. to 230° C. over 3 hours. Then, while produced condensed water was distilled off with the water separator, the temperature was maintained at 230° C., and the mixture was reacted until the acid value reached 3 mg KOH/g or less. To this reaction product, 59 parts of trimellitic anhydride was added, and addition reaction was performed at 170° C. for 30 minutes. Then, the mixture was cooled to 50° C. or lower, and 2-(dimethylamino)ethanol was added in an amount equivalent to the acid groups to neutralize the mixture. Then, deionized water was gradually added, and an aqueous dispersion of polyester resin particles (A4-1) having a solid content concentration of 45% was produced. The resulting polyester resin particles (A4-1) had an acid value of 35 mg KOH/g, a hydroxyl value of 128 mg KOH/g, an average particle size of 100 nm (measured at 20° C. by diluting with deionized water and using a submicron particle size distribution measurement device "Microtrac MT3000" (trade name, available from Microtrac Retsch GmbH)), and a number average molecular weight of 1500.
Urethane Resin Particles (A1)

Production Example 3

A reaction vessel equipped with a thermometer, a thermostat, a stirrer, and a reflux condenser was charged with 68.9 parts of "PTMG-1000" (trade name, available from Mitsubishi Chemical Corporation, polytetramethylene ether glycol, molecular weight of about 1000), 3.6 parts of dimethylolpropionic acid, 1.5 parts of trimethylolpropane, 0.1 parts of "Neostann U-600" (trade name, available from Nitto Kasei Co., Ltd., bismuth-based catalyst), and 100 parts of methyl ethyl ketone solvent, the temperature was raised to 80° C. while stirring, and then 26.1 parts of isophorone diisocyanate was added dropwise over 30 minutes. Thereafter, the reaction was carried out while the temperature was maintained at 80° C. until an NCO value became 6.1 mg/g or less, and then cooled to room temperature, thereby producing a prepolymer solution of a polyurethane resin having a terminal isocyanate group. The resulting urethane prepolymer had a number average molecular weight of 9000.

Subsequently, after stirring was continued and a resin viscosity was reduced with 100 parts of a methyl ethyl ketone solvent, 2.1 parts of dimethylethanolamine was added to perform neutralization, and water dispersion (phase inversion emulsification) was performed while appropriately adding 148.8 parts of deionized water.

After completion of water dispersion (emulsification), 0.6 parts of ethylenediamine was added, and the mixture was heated to 40° C. and stirred for 2 hours. In this manner, a chain extension reaction between the terminal isocyanate group of the urethane resin and diamine was carried out.

Thereafter, stirring was continued, and the solvent was removed under reduced pressure while the temperature was raised to 60° C. The reduced pressure was returned to normal pressure at the time when all the blended methyl ethyl ketone solvent was distilled off, and after cooling, the deionized water that had been excessively distilled off was corrected to produce an aqueous dispersion of urethane resin particles (A1-1) having a solid content concentration of 40%.

The resulting urethane resin particles (A1-1) had an average particle size of 90 nm (measured at 20° C. by diluting with deionized water using a submicron particle size distribution measurement device "Microtrac MT3000" (trade name, available from Microtrac Retsch GmbH)), an acid value of 12 mg KOH/g, a hydroxyl value of 0 mg KOH/g, and a viscosity measured by a Brookfield viscosimeter at a temperature of 20° C. and a rotor rotation speed of 60 rpm of 5000 mPa s. The number average molecular weight exceeded the exclusion limit capacity of a GPC measuring apparatus and could not be measured. (Estimated at approximately one million or more.)

Production Example 4

A reaction vessel equipped with a thermometer, a thermostat, a stirrer, and a reflux condenser was charged with 68.9 parts of "PTMG-1000" (trade name, available from Mitsubishi Chemical Corporation, polytetramethylene ether glycol, molecular weight of about 1000), 2.9 parts of dimethylolpropionic acid, 1.5 parts of trimethylolpropane, 0.1 parts of "Neostann U-600" (trade name, available from Nitto Kasei Co., Ltd., bismuth-based catalyst), and 100 parts of methyl ethyl ketone solvent, the temperature was raised to 80° C. while stirring, and then 26.1 parts of isophorone diisocyanate was added dropwise over 30 minutes. Thereafter, the reaction was carried out while maintaining the temperature at 80° C. until the NCO value became 6.2 mg/g or less, followed by cooling to room temperature, thereby producing a prepolymer solution of a polyurethane resin having a terminal isocyanate group. The resulting urethane prepolymer had a number average molecular weight of 9000.

Subsequently, after stirring was continued and a resin viscosity was reduced with 100 parts of a methyl ethyl ketone solvent, 1.0 part of dimethylethanolamine was added to perform neutralization, and water dispersion (phase inversion emulsification) was performed while appropriately adding 148.8 parts of deionized water.

After completion of water dispersion (emulsification), 0.6 parts of ethylenediamine was added, and the mixture was heated to 40° C. and stirred for 2 hours. In this manner, a chain extension reaction between the terminal isocyanate group of the urethane resin and diamine was carried out.

Thereafter, stirring was continued, and the solvent was removed under reduced pressure while the temperature was raised to 60° C. The reduced pressure was returned to normal pressure at the time when all the combined methyl ethyl ketone solvent was distilled off, and after cooling, the deionized water that had been excessively distilled off was corrected to produce an aqueous dispersion of urethane resin particles (A1-2) having a solid content concentration of 40%.

The resulting urethane resin particles (A1-2) had an average particle size of 400 nm (measured at 20° C. by diluting with deionized water using a submicron particle size distribution measurement device "Microtrac MT3000" (trade name, available from Microtrac Retsch GmbH)), an acid value of 12 mg KOH/g, a hydroxyl value of 0 mg KOH/g, and a viscosity measured by a Brookfield viscosimeter at a temperature of 20° C. and a rotor rotation speed of 60 rpm of 270 mPa s. The number average molecular weight exceeded the exclusion limit capacity of a GPC measuring apparatus and could not be measured. (Estimated at approximately one million or more.)

Acrylic Resin Particles (A2)

Production Example 5

In a glass beaker, 67.2 parts of 2-ethylhexyl acrylate and 2.8 parts of allyl methacrylate were mixed, then 7 parts of "Newcol 707SF" (trade name, available from Nippon Nyukazai Co., Ltd., anionic emulsifier having a polyoxyethylene chain, active ingredient of 30%), and 70 parts of deionized water were added, and the mixture was stirred for 15 minutes at 2000 rpm with a disper to prepare a preliminary emulsified liquid (1). The preliminary emulsified liquid (1) was subjected to high-pressure treatment using a high-pressure emulsifying apparatus (available from Sugino Machine Limited, ultimizer) to produce a monomer emulsion (1) having an average particle size of 60 nm.

In another glass beaker, 1.2 parts of allyl methacrylate, 4.8 parts of 4-hydroxybutyl acrylate, 1.2 parts of methacrylic acid, and 22.8 parts of methyl methacrylate were mixed, then 3 parts of "Newcol 707SF", 0.03 parts of ammonium persulfate, and 20 parts of deionized water were added, and the mixture was stirred for 15 minutes at 2000 rpm with a disper to prepare a monomer emulsion (2).

The monomer emulsion (1) was transferred to a reaction vessel equipped with a thermometer, a thermostat, a stirrer, a reflux condenser, a nitrogen inlet tube, and a dropping device, and diluted with 59 parts of deionized water. Thereafter, the temperature was raised to 80° C., 0.7 parts of ammonium persulfate was added, and the mixture was stirred for 3 hours while maintaining the temperature at 80° C.

After the monomer emulsion (2) was further added dropwise over 1 hour and the mixture was aged for 1 hour, the mixture was cooled to 30° C. and pH was adjusted to 8.0 while a 5% aqueous solution of 2-(dimethylamino)ethanol was gradually added to the reaction vessel. The mixture was further diluted with deionized water to have a solid content concentration of 30%, thereby producing a dispersion liquid of acrylic resin particles (A2-1).

The resulting acrylic resin particles (A2-1) had an average particle size of 100 nm (measured at 20° C. after diluting with deionized water using a submicron particle size distribution measurement device "Microtrac MT3000" (trade name, available from Microtrac Retsch GmbH)), a hydroxyl value of 19 mg KOH/g, and an acid value of 8 mg KOH/g.

Production Example 6

A dispersion liquid of acrylic resin particles (A2-2) having a solid content concentration of 30% was produced in the same manner as in Production Example 5 except that the monomer emulsion (1) having an average particle size of 320 nm was produced by adjusting the pressure in the high-pressure emulsification treatment for producing the monomer emulsion (1) in Production Example 5.

The resulting acrylic resin particles (A2-2) had an average particle size of 350 nm (measured at 20° C. after diluting with deionized water using a submicron particle size distribution measurement device "Microtrac MT3000" (trade name, available from Microtrac Retsch GmbH)), a hydroxyl value of 19 mg KOH/g, and an acid value of 8 mg KOH/g.

Production Example 7

A dispersion liquid of acrylic resin particles (A2-3) having a solid content concentration of 30% was produced in the same manner as in Production Example 5 except that the monomer emulsion (1) having an average particle size of 690 nm was produced by adjusting the pressure in the high-pressure emulsification treatment for producing the monomer emulsion (1) in Production Example 5.

The resulting acrylic resin particles (A2-3) had an average particle size of 700 nm (measured at 20° C. by diluting with deionized water and using a submicron particle size distribution measurement device "Microtrac MT3000" (trade name, available from Microtrac Retsch GmbH)), a hydroxyl value of 19 mg KOH/g, and an acid value of 8 mg KOH/g.

Production of Water-soluble Acrylic Resin

Production Example 8

A reaction vessel equipped with a thermometer, a thermostat, a stirrer, and a reflux condenser was charged with 35 parts of propylene glycol monopropyl ether, and the temperature was raised to 85° C. Subsequently, a mixture of 43 parts of methyl methacrylate, 20 parts of 2-ethylhexyl acrylate, 29 parts of n-butyl acrylate, 2 parts of hydroxyethyl acrylate, 6 parts of acrylic acid, 15 parts of propylene glycol monopropyl ether, and 1.1 parts of 2,2'-azobis(2,4-dimethylvaleronitrile) was added dropwise over 4 hours, and after completion of the dropwise addition, the mixture was aged for 1 hour. A mixture of 10 parts of propylene glycol monopropyl ether and 1 part of 2,2'-azobis(2,4-dimethylvaleronitrile) was then further added dropwise over 1 hour, and after completion of the dropwise addition, the mixture was aged for 1 hour. Then, 7.4 parts of diethanolamine was added, and a water-soluble acrylic resin (Ac-1) solution having a solid content concentration of 55%, an acid value of 47 mg KOH/g, and a hydroxyl value of 10 mg KOH/g was produced.

Production of Pigment Dispersion Paste

Production Example 9

87.5 parts (solid content of 35 parts) of the aqueous dispersion of the acrylic-polyester composite resin particles (A5-1) produced in Production Example 1, 9.5 parts of "JR-806" (trade name, available from Tayca Corporation, rutile-type titanium dioxide), 1.9 parts of "Carbon MA-100" (trade name, available from Mitsubishi Chemical Corporation, carbon black), 65 parts of "BARIACE B-35" (trade name, available from Sakai Chemical Industry Co., Ltd., barium sulfate powder, average primary particle size of 0.5 μm), and 5 parts of deionized water were mixed, and pH was adjusted to 8.0 with 2-(dimethylamino)ethanol. Then, the mixture was dispersed using a paint shaker for 30 minutes to produce a pigment dispersion paste (P-1).

Production Example 10

77.8 parts (solid content of 35 parts) of the aqueous dispersion of the polyester resin particles (A4-1) produced in Production Example 2, 9.5 parts of "JR-806" (trade name, available from Tayca Corporation, rutile-type titanium dioxide), 1.9 parts of "Carbon MA-100" (trade name, available from Mitsubishi Chemical Corporation, carbon black), 65 parts of "BARIACE B-35" (trade name, available from Sakai Chemical Industry Co., Ltd., barium sulfate powder, average primary particle size of 0.5 μm), and 5 parts of deionized water were mixed, and pH was adjusted to 8.0 with 2-(dimethylamino)ethanol. Then, the mixture was dispersed using a paint shaker for 30 minutes to produce a pigment dispersion paste (P-2).

Production Example 11

87.5 parts (solid content of 35 parts) of the aqueous dispersion of the acrylic-polyester composite resin particles (A5-1) produced in Production Example 1, 125 parts of "JR-806" (trade name, available from Tayca Co., Ltd., rutile titanium dioxide), and 5 parts of deionized water were mixed, and pH was adjusted to 8.0 with 2-(dimethylamino)ethanol. Then, the mixture was dispersed using a paint shaker for 30 minutes to produce a pigment dispersion paste (P-3).

Production of Aqueous Coating Composition for Automotive Exterior

Example 1

168.9 parts (solid content of 111.4 parts) of the pigment dispersion paste produced in Production Example 9, 25 parts (resin solid content of 10 parts) of the dispersion liquid of the urethane resin particles (A1-1) produced in Production Example 3, 33.3 parts (resin solid content of 10 parts) of the dispersion liquid of the acrylic resin particles (A2-1) produced in Production Example 5, 37.5 parts (resin solid content of 30 parts) of "CYMEL 325" (trade name, available from Allnex, melamine resin, solid content of 80%), 26.3 parts (resin solid content of 10 parts) of "Bayhydur VPLS2310" (trade name, available from Sumika Covestro Urethane Co., Ltd., oxime-blocked polyisocyanate compound, solid content of 38%), 75 parts (solid content of 0.75 parts) of "Cellenpia TC-OiA" (trade name, available from Nippon Paper Industries Co., Ltd., cellulose nanofiber, solid content of 1%), 14 parts of 2-ethyl-1-hexanol (solubility in water at 20° C. of 0.07 mass %), and 9.1 parts (resin solid content of 5 parts) of the water-soluble acrylic resin (Ac-1) solution produced in Production Example 8 were uniformly mixed.

Then, 2-(dimethylamino) ethanol and deionized water were added to the resulting mixture to produce an aqueous coating composition No. 1 for automotive exterior having pH of 8.0, a solid content concentration of the coating composition of 45%, a 1 viscosity of the coating composition measured at a temperature of 20° C. and a rotor rotation speed of 60 rpm by a Brookfield viscosimeter of 700 mPa s, and a Ti value of 3.7 which is (coating viscosity at a rotor speed of 6 rpm)/(coating viscosity at a rotor speed of 60 rpm) measured by a Brookfield viscosimeter.

Examples 2 to 20 and Comparative Examples 1 to 9

Aqueous coating compositions Nos. 2 to 29 for automotive exterior were produced in the same manner as in Example 1 except that formulations of the components were changed to the formulations shown in the following Table 1. Note that the aqueous coating composition No. 29 for automotive exterior of Comparative Example 9 was not evaluated because aggregates were present in the coating composition and the viscosity of the coating composition measured at a temperature of 20° C. and a rotor rotational speed of 6 rpm by a Brookfield viscosimeter was higher than the measurement limit of the viscosimeter and could not be measured.

In Table 1, for the organic solvent (E) having a solubility in water of 4 mass % or less, the addition amount is described, and for components other than the organic solvent (E) having a solubility in water of 4 mass % or less, the solid content is described. The components shown in Table 1 are as follows.

(Note 1) "CelluForce NCC": trade name, available from CelluForce, sodium sulfonate type nanocellulose crystal, (Note 2) "UH-752": trade name, available from ADEKA Corporation, urethane associative thickener, and (Note 3) "PRIMAL ASE-60": trade name, available from The Dow Chemical Company, polyacrylic acid-based thickener.

Preparation of Object to Be Coated for Testing

"Elecron GT-10" (trade name, available from Kansai Paint Co., Ltd., cationic electrodeposition paint) was applied by electrodeposition onto a cold-rolled steel sheet chemically treated with zinc phosphate having a size of 11 cm×45 cm to have a dried film thickness of 20 μm, the coated steel sheet was heated at 170° C. for 30 minutes to cure the electrodeposited coating film to prepare an electrodeposition-coated steel sheet. Next, 21 punch holes each having a diameter of 5 mm were provided in a row at 2 cm intervals in a portion 3 cm away from the end portion on the long side of the resulting electrodeposition-coated steel sheet to produce a test object to be coated.

Evaluation of Sagging Resistance

Preparation of Coated Sheet for Sagging Resistance Evaluation

Each of the aqueous coating compositions for automotive exterior was applied onto the test object to be coated using a rotary atomization-type electrostatic coater under conditions of 27° C. and 50% relative humidity with a film thickness gradient to provide a film thickness of approximately 30 μm to 60 μm in a longitudinal direction, and the coated sheet was stood approximately vertically and left to stand for 3 minutes, and then preheated at 80° C. for 3 minutes. Then, after being left to stand for 7 minutes, the coated sheet was heated at 140° C. for 30 minutes to cure the coating film, thereby preparing each coated sheet for sagging resistance evaluation.

Sagging Resistance

For each of the resulting coated sheets for sagging resistance evaluation, a sagging limit film thickness (μm), which was a thickness at a position of a punch hole having the smallest thickness among the punch holes in which sagging of the coating film from the lower end of the punch hole of 5 mm or more was observed, was measured, and the sagging resistance was evaluated based on the following criteria. The larger the sagging limit film thickness is, the better the sagging resistance is, and A and B are acceptable.

A: Sagging limit film thickness is 45 μm or more,
B: Sagging limit film thickness is 40 μm or more and less than 45 μm,
C: Sagging limit film thickness is 35 μm or more and less than 40 μm, and
D: Sagging limit film thickness is less than 35 μm.

Evaluation of Popping Resistance

Preparation of Coated Sheet for Popping Resistance Evaluation

Each aqueous coating composition for automotive exterior was applied as the first colored coating onto the test object to be coated using a rotary atomization-type electrostatic coater under conditions of 27° C. and 50% relative humidity with a film thickness gradient to provide a film thickness of approximately 30 μm to 60 μm in the longitudinal direction, left to stand for 3 minutes, and then preheated at 80° C. for 3 minutes. Subsequently, the uncured first colored coating film was electrostatically coated with "WBC-713T No. 1F7" (trade name, available from Kansai Paint Co., Ltd., an acrylic melamine resin-based aqueous basecoat coating, silver color) using a rotary atomization-type electrostatic coater to give a dried film thickness of 15 μm. The resulting product was left to stand for 5 minutes and then preheated at 80° C. for 3 minutes.

Next, the uncured second colored coating film was electrostatically coated with "KINO-1209" (trade name, available from Kansai Paint Co., Ltd., an acrylic resin-based solvent-type clear coating) to give a cured film thickness of 35 μm. The resulting product was left to stand for 7 minutes and then heated at 140° C. for 30 minutes to cure the multilayer coating film including the first colored coating film, the second colored coating film, and the clear coating film, thereby preparing each coated sheet for popping resistance evaluation.

A position at which popping was observed in each of the resulting coated sheets for popping resistance evaluation was checked, and a popping limit film thickness (m), which was a film thickness at the position, was measured, and the popping resistance was evaluated based on the following criteria. The larger the popping limit film thickness is, the better the popping resistance is, and A and B are acceptable.

A: Popping limit film thickness is 40 m or more
B: Popping limit film thickness is 35 m or more and less than 40 m
C: Popping limit film thickness is less than 35 μm

TABLE 1

| | | | Examples | | | | | |
|---|---|---|---|---|---|---|---|---|
| | | | 1 | 2 | 3 | 4 | 5 | 6 |
| Aqueous coating composition No. for automotive exterior | | | 1 | 2 | 3 | 4 | 5 | 6 |
| Name of pigment dispersion paste | | | (P-1) | (P-2) | (P-1) | (P-1) | (P-1) | (P-1) |
| Blending amount of pigment dispersion paste | | | 111.4 | 111.4 | 111.4 | 111.4 | 111.4 | 111.4 |
| Resin particles (A) | Urethane resin particles (A1) | Urethane resin particles (A1-1) | 10 | | | | | |
| | | Urethane resin particles (A1-2) | | 10 | 10 | | | |
| | Acrylic resin particles (A2) | Acrylic resin particles (A2-1) | 10 | 10 | 10 | 20 | 10 | 10 |
| | | Acrylic resin particles (A2-2) | | | | | 10 | |
| | | Acrylic resin particles (A2-3) | | | | | | 10 |

TABLE 1-continued

| | | | | | | | | |
|---|---|---|---|---|---|---|---|---|
| Crosslinking agent (B) | Amino resin (B1) | "CYMEL 325" | 30 | 30 | 30 | 30 | 30 | 30 |
| | Blocked polyisocyanate compound (B3) | "Bayhydur VPLS2310" | 10 | 10 | 10 | 10 | 10 | 10 |
| Nanocellulose (D) | Cellulose nanofibers (D1) | "Cellenpia TC-01A" | 0.75 | 0.75 | 0.75 | 0.75 | 0.75 | 0.75 |
| | Cellulose nanocrystal (D2) | "CelluForce NCC" (Note 1) | | | | | | |
| Organic solvent (E) having solubility in water of 4 mass % or less | | 2-ethyl-1-hexanol | 14 | 14 | 14 | 14 | 14 | 14 |
| Additional component | Water-soluble acrylic resin | Water-soluble acrylic resin (Ac-1) | 5 | 5 | 5 | 5 | 5 | 5 |
| | Thickener | "UH-752" (Note 2) "Primal ASE-60" (Note 3) | | | | | | |
| Resin solid content [parts by mass] | | | 100 | 100 | 100 | 100 | 100 | 100 |
| Solid content [parts by mass] of nanocellulose (D) based on 100 parts by mass of resin solid content in coating | | | 0.75 | 0.75 | 0.75 | 0.75 | 0.75 | 0.75 |
| Content [parts by mass] of organic solvent (E) having solubility in water of 4 mass % or less based on 100 parts by mass of resin solid content in coating | | | 14 | 14 | 14 | 14 | 14 | 14 |
| Solid content concentration of the coating composition [mass %] | | | 45 | 47 | 47 | 45 | 45 | 47 |
| Coating viscosity [MPa·s] measured by Brookfield-type viscometer under measurement conditions of temperature of 20° C. and rotor rotation speed of 60 rpm | | | 700 | 800 | 800 | 700 | 700 | 800 |
| | | Ti value | 3.7 | 3.7 | 3.6 | 3.7 | 3.7 | 3.8 |
| Evaluation result | | Sagging resistance | A | A | A | A | A | A |
| | | Popping resistance | B | B | A | B | A | A |

(Continuation-1)

| | | | Examples | | | | | | |
|---|---|---|---|---|---|---|---|---|---|
| | | | 7 | 8 | 9 | 10 | 11 | 12 | 13 |
| Aqueous coating composition No. for automotive exterior | | | 7 | 8 | 9 | 10 | 11 | 12 | 13 |
| Name of pigment dispersion paste | | | (P-1) | (P-1) | (P-1) | (P-1) | (P-1) | (P-1) | (P-1) |
| Blending amount of pigment dispersion paste | | | 111.4 | 111.4 | 111.4 | 111.4 | 111.4 | 111.4 | 111.4 |
| Resin particles (A) | Urethane resin particles (A1) | Urethane resin particles (A1-1) | | | | | | | |
| | | Urethane resin particles (A1-2) | 10 | 10 | 10 | 10 | 10 | 10 | 10 |
| | Acrylic resin particles (A2) | Acrylic resin particles (A2-1) | 10 | 10 | 10 | 10 | 10 | 10 | 10 |
| | | Acrylic resin particles (A2-2) | | | | | | | |
| | | Acrylic resin particles (A2-3) | | | | | | | |
| Crosslinking agent (B) | Amino resin (B1) | "CYMEL 325" | 30 | 30 | 30 | 30 | 30 | 30 | 20 |
| | Blocked polyisocyanate compound (B3) | "Bayhydur VPLS2310" | 10 | 10 | 10 | 10 | 10 | 10 | 20 |
| Nanocellulose (D) | Cellulose nanofibers (D1) | "Cellenpia TC-01A" | 0.50 | 1.00 | | | 0.75 | 0.75 | 0.75 |
| | Cellulose nanocrystal (D2) | "CelluForce NCC" (Note 1) | | | 1.00 | 2.00 | | | |
| Organic solvent (E) having solubility in water of 4 mass % or less | | 2-ethyl-1-hexanol | 14 | 14 | 14 | 14 | 11 | 18 | 14 |
| Additional component | Water-soluble acrylic resin | Water-soluble acrylic resin (Ac-1) | 5 | 5 | 5 | 5 | 5 | 5 | 5 |
| | Thickener | "UH-752" (Note 2) "Primal ASE-60" (Note 3) | | | | | | | |
| Resin solid content [parts by mass] | | | 100 | 100 | 100 | 100 | 100 | 100 | 100 |
| Solid content [parts by mass] of nanocellulose (D) based on 100 parts by mass of resin solid content in coating | | | 0.50 | 1.00 | 1.00 | 2.00 | 0.75 | 0.75 | 0.75 |
| Content [parts by mass] of organic solvent (E) having solubility in water of 4 mass % or less based on 100 parts by mass of resin solid content in coating | | | 14 | 14 | 14 | 14 | 11 | 18 | 14 |
| Solid content concentration of the coating composition [mass %] | | | 50 | 45 | 53 | 50 | 47 | 47 | 47 |
| Coating viscosity [MPa·s] measured by Brookfield-type viscometer under measurement conditions of temperature of 20° C. and rotor rotation speed of 60 rpm | | | 700 | 850 | 800 | 850 | 800 | 800 | 700 |

TABLE 1-continued

|  |  |  | | | | | | | |
|---|---|---|---|---|---|---|---|---|---|
| | Ti value | | 2.8 | 4.0 | 3.4 | 4.6 | 3.5 | 4.0 | 3.7 |
| Evaluation result | Sagging resistance | | B | A | A | A | A | A | A |
| | Popping resistance | | B | A | B | B | B | A | A |

(Continuation-2)

| | | | Examples | | | | | | |
|---|---|---|---|---|---|---|---|---|---|
| | | | 14 | 15 | 16 | 17 | 18 | 19 | 20 |
| Aqueous coating composition No. for automotive exterior | | | 14 | 15 | 16 | 17 | 18 | 19 | 20 |
| Name of pigment dispersion paste | | | (P-1) | (P-1) | (P-1) | (P-1) | (P-3) | (P-3) | (P-3) |
| Blending amount of pigment dispersion paste | | | 111.4 | 111.4 | 111.4 | 111.4 | 160.0 | 160.0 | 160.0 |
| Resin particles (A) | Urethane resin particles (A1) | Urethane resin particles (A1-1) | | | | | | | |
| | | Urethane resin particles (A1-2) | 10 | 10 | 10 | 20 | 10 | 10 | 20 |
| | Acrylic resin particles (A2) | Acrylic resin particles (A2-1) | 10 | 10 | 10 | | 10 | 10 | |
| | | Acrylic resin particles (A2-2) | | | | | | | |
| | | Acrylic resin particles (A2-3) | | | | | | | |
| Crosslinking agent (B) | Amino resin (B1) | "CYMEL 325" | 30 | 30 | 30 | 30 | 30 | 30 | 30 |
| | Blocked polyisocyanate compound (B3) | "Bayhydur VPLS2310" | 10 | 10 | 10 | 10 | 10 | 10 | 10 |
| Nanocellulose (D) | Cellulose nanofibers (D1) | "Cellenpia TC-01A" | 0.75 | 0.75 | 0.75 | | 0.75 | | |
| | Cellulose nanocrystal (D2) | "CelluForce NCC" (Note 1) | | | | 1.00 | | 1.00 | 1.00 |
| Organic solvent (E) having solubility in water of 4 mass % or less | | 2-ethyl-1-hexanol | 14 | 14 | 14 | 14 | 14 | 14 | 14 |
| Additional component | Water-soluble acrylic resin | Water-soluble acrylic resin (Ac-1) "UH-752" (Note 2) | 5 | 5 | 5 | 5 | 5 | 5 | 5 |
| | Thickener | "Primal ASE-60" (Note 3) | | | | | | | |
| Resin solid content [parts by mass] | | | 100 | 100 | 100 | 100 | 100 | 100 | 100 |
| Solid content [parts by mass] of nanocellulose (D) based on 100 parts by mass of resin solid content in coating | | | 0.75 | 0.75 | 0.75 | 1.00 | 0.75 | 1.00 | 1.00 |
| Content [parts by mass] of organic solvent (E) having solubility in water of 4 mass % or less based on 100 parts by mass of resin solid content in coating | | | 14 | 14 | 14 | 14 | 14 | 14 | 14 |
| Solid content concentration of the coating composition [mass %] | | | 45 | 46 | 47 | 55 | 58 | 62 | 64 |
| Coating viscosity [MPa·s] measured by Brookfield-type viscometer under measurement conditions of temperature of 20° C. and rotor rotation speed of 60 rpm | | | 350 | 500 | 600 | 1000 | 800 | 900 | 1100 |
| | Ti value | | 3.7 | 3.7 | 3.7 | 2.9 | 3.7 | 3.2 | 2.8 |
| Evaluation result | Sagging resistance | | B | B | B | A | B | B | B |
| | Popping resistance | | B | B | B | B | B | A | B |

(Continuation-3)

| | | | Comparative Examples | | | |
|---|---|---|---|---|---|---|
| | | | 1 | 2 | 3 | 4 |
| Aqueous coating composition No. for automotive exterior | | | 21 | 22 | 23 | 24 |
| Name of pigment dispersion paste | | | (P-1) | (P-1) | (P-1) | (P-1) |
| Blending amount of pigment dispersion paste | | | 111.4 | 111.4 | 111.4 | 111.4 |
| Resin particles (A) | Urethane resin particles (A1) | Urethane resin particles (A1-1) | | | | |
| | | Urethane resin particles (A1-2) | 10 | 10 | 10 | 10 |
| | Acrylic resin particles (A2) | Acrylic resin particles (A2-1) | 10 | 10 | 10 | 10 |
| | | Acrylic resin particles (A2-2) | | | | |
| | | Acrylic resin particles (A2-3) | | | | |
| Crosslinking agent (B) | Amino resin (B1) | "CYMEL 325" | 30 | 30 | 30 | 30 |
| | Blocked polyisocyanate compound (B3) | "Bayhydur VPLS2310" | 10 | 10 | 10 | 10 |

TABLE 1-continued

| | | | | | | |
|---|---|---|---|---|---|---|
| Nanocellulose (D) | Cellulose nanofibers (D1) | "Cellenpia TC-01A" | | | | |
| | Cellulose nanocrystal (D2) | "CelluForce NCC" (Note 1) | | | | |
| Organic solvent (E) having solubility in water of 4 mass % or less | | 2-ethyl-1-hexanol | 18 | 18 | 14 | 14 |
| Additional component | Water-soluble acrylic resin | Water-soluble acrylic resin (Ac-1) | 5 | 5 | 5 | 5 |
| | Thickener | "UH-752" (Note 2) | 0.3 | 0.6 | | |
| | | "Primal ASE-60" (Note 3) | | | 0.1 | 0.2 |
| Resin solid content [parts by mass] | | | 100 | 100 | 100 | 100 |
| Solid content [parts by mass] of nanocellulose (D) based on 100 parts by mass of resin solid content in coating | | | 0.00 | 0.00 | 0.00 | 0.00 |
| Content [parts by mass] of organic solvent (E) having solubility in water of 4 mass % or less based on 100 parts by mass of resin solid content in coating | | | 18 | 18 | 14 | 14 |
| Solid content concentration of the coating composition [mass %] | | | 47 | 47 | 47 | 47 |
| Coating viscosity [MPa · s] measured by Brookfield-type viscometer under measurement conditions of temperature of 20° C. and rotor rotation speed of 60 rpm | | | 200 | 700 | 500 | 800 |
| | | Ti value | 2.0 | 2.0 | 2.0 | 2.5 |
| Evaluation result | | Sagging resistance | D | D | C | B |
| | | Popping resistance | C | C | B | C |

(Continuation-4)

| | | | Comparative Examples | | | | |
|---|---|---|---|---|---|---|---|
| | | | 5 | 6 | 7 | 8 | 9 |
| Aqueous coating composition No. for automotive exterior | | | 25 | 26 | 27 | 28 | 29 |
| Name of pigment dispersion paste | | | (P-1) | (P-1) | (P-1) | (P-1) | (P-3) |
| Blending amount of pigment dispersion paste | | | 111.4 | 111.4 | 111.4 | 111.4 | 160.0 |
| Resin particles (A) | Urethane resin particles (A1) | Urethane resin particles (A1-1) | | | | | |
| | | Urethane resin particles (A1-2) | 10 | 10 | 10 | 10 | 20 |
| | Acrylic resin particles (A2) | Acrylic resin particles (A2-1) | 10 | 10 | 10 | 10 | |
| | | Acrylic resin particles (A2-2) | | | | | |
| | | Acrylic resin particles (A2-3) | | | | | |
| Crosslinking agent (B) | Amino resin (B1) | "CYMEL 325" | 30 | 30 | 30 | 30 | 30 |
| | Blocked polyisocyanate compound (B3) | "Bayhydur VPLS2310" | 10 | 10 | 10 | 10 | 10 |
| Nanocellulose (D) | Cellulose nanofibers (D1) | "Cellenpia TC-01A" | 0.25 | 2.00 | 2.50 | 2.00 | |
| | Cellulose nanocrystal (D2) | "CelluForce NCC" (Note 1) | | | | | 1.00 |
| Organic solvent (E) having solubility in water of 4 mass % or less | | 2-ethyl-1-hexanol | 14 | 14 | 14 | 14 | 14 |
| Additional component | Water-soluble acrylic resin | Water-soluble acrylic resin (Ac-1) | 5 | 5 | 5 | 5 | 5 |
| | Thickener | "UH-752" (Note 2) | | | | | |
| | | "Primal ASE-60" (Note 3) | | | | | |
| Resin solid content [parts by mass] | | | 100 | 100 | 100 | 100 | 100 |
| Solid content [parts by mass] of nanocellulose (D) based on 100 parts by mass of resin solid content in coating | | | 0.25 | 2.00 | 2.50 | 2.00 | 1.00 |
| Content [parts by mass] of organic solvent (E) having solubility in water of 4 mass % or less based on 100 parts by mass of resin solid content in coating | | | 14 | 14 | 14 | 14 | 14 |
| Solid content concentration of the coating composition [mass %] | | | 53 | 35 | 31 | 36 | 70 |
| Coating viscosity [MPa · s] measured by Brookfield-type viscometer under measurement conditions of temperature of 20° C. and rotor rotation speed of 60 rpm | | | 800 | 850 | 900 | 1100 | 1800 |
| | | Ti value | 2.2 | 5.2 | 6.0 | 4.0 | Unevaluable |
| Evaluation result | | Sagging resistance | B | C | C | C | Unevaluable |
| | | Popping resistance | C | C | C | C | Unevaluable |

The invention claimed is:

1. An aqueous coating composition for an automotive exterior, the aqueous coating composition comprising:
   resin particles (A);
   a crosslinking agent (B);
   a pigment (C); and
   a nanocellulose (D),
   wherein
   a content of the nanocellulose (D) is 0.5 to 2.0 parts by mass in terms of solid content with respect to 100 parts by mass of a resin solid content in the coating composition,
   a solid content concentration of the coating composition is in a range from 45 to 65 mass %, and
   a viscosity of the coating composition measured by a Brookfield-type viscometer under measurement conditions of a temperature of 20° C. and a rotor rotation speed of 60 rpm is in a range from 350 to 1200 mPa·s.

2. The aqueous coating composition for an automotive exterior according to claim 1, wherein the resin particles (A) have an average particle size in a range from 300 to 800 nm.

3. The aqueous coating composition for an automotive exterior according to claim 1, wherein the nanocellulose (D) is at least one type selected from the group consisting of cellulose nanofibers (D1) and cellulose nanocrystals (D2).

4. The aqueous coating composition for an automotive exterior according to claim 1, wherein the aqueous coating composition comprises no organic solvent (E) having a solubility in water at 20° C. of 4 mass % or less, or a content of the organic solvent (E) having a solubility in water at 20° C. of 4 mass % or less is 19 parts by mass or less with respect to 100 parts by mass of the resin solid content in the coating composition.

5. The aqueous coating composition for an automotive exterior according to claim 4, wherein the content of the organic solvent (E) having a solubility in water at 20° C. of 4 mass % or less is in a range from 1 to 19 parts by mass with respect to 100 parts by mass of the resin solid content in the coating composition.

6. An automobile coated with the aqueous coating composition for an automotive exterior described in claim 1.

7. A method for forming a coating film, comprising applying the aqueous coating composition for an automotive exterior described in claim 1 onto an object to be coated.

8. A method for forming a multilayer coating film, the method comprising:
   (1) applying the aqueous coating composition for an automotive exterior described in claim 1 onto an object to be coated to form a first colored coating film;
   (2) applying, on the first colored coating film that is uncured, an aqueous second colored coating composition to form a second colored coating film;
   (3) applying, on the second colored coating film that is uncured, a clearcoat coating composition to form a clearcoat coating film; and
   (4) simultaneously heat-curing the first colored coating film that is uncured, the second colored coating film that is uncured, and the clearcoat coating film that is uncured.

* * * * *